(12) United States Patent
Powley et al.

(10) Patent No.: US 11,080,230 B2
(45) Date of Patent: Aug. 3, 2021

(54) HARDWARE ACCELERATORS AND METHODS FOR OUT-OF-ORDER PROCESSING

(71) Applicant: Intel Corporation, Santa Clara, CA (US)

(72) Inventors: George Powley, Northborough, MA (US); Mir Ahsan, Toronto (CA)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/236,154

(22) Filed: Dec. 28, 2018

(65) Prior Publication Data
US 2020/0210370 A1 Jul. 2, 2020

(51) Int. Cl.
*G06F 15/80* (2006.01)
(52) U.S. Cl.
CPC .................. *G06F 15/8046* (2013.01)
(58) Field of Classification Search
None
See application file for complete search history.

(56) References Cited

U.S. PATENT DOCUMENTS

| | | | | |
|---|---|---|---|---|
| 6,112,288 A | * | 8/2000 | Ullner | G06F 9/3851 707/999.006 |
| 9,165,109 B2 | * | 10/2015 | Chaisson | G16B 30/00 |
| 2017/0308644 A1 | * | 10/2017 | van Rooyen | G16B 50/00 |

OTHER PUBLICATIONS

Huang S., et al., Hardware Acceleration of the Pair-HMM Algorithm for DNA Variant Calling, FPGA'17, ACM, Feb. 22-24, 2017, pp. 275-284.
Rauer C., et al., "Accelerating Genomics Research with OpenCL and FPGAs," Altera Corporation, White Paper, WP-01262-1.0, Mar. 2016, pp. 1-10.
Rauer C., et al., "Accelerating Genomics Research with OpenCL and FPGAs," Intel, White Paper, 2017, pp. 1-7.

* cited by examiner

*Primary Examiner* — Corey S Faherty
(74) *Attorney, Agent, or Firm* — Nicholson De Vos Webster & Elliott LLP

(57) ABSTRACT

Hardware accelerators and methods for out-of-order processing are described. In one embodiment, a processor includes a hardware accelerator having a plurality of processing elements coupled to form a plurality of logical rows of a multidimensional processing array and a plurality of logical columns of the multidimensional processing array, wherein a processing element of the plurality of processing elements includes a switch to selectively source, from either of an output for a first dataset from an upstream processing element of the plurality of processing elements or a boundary condition value for a second dataset stored in the processing element, based on a switch control value provided to the processing element; and a core coupled to the hardware accelerator.

20 Claims, 20 Drawing Sheets

1000

```
┌─────────────────────────────────────────────────────────┐
│ CONCURRENTLY PROCESSING A FIRST DATASET AND A SECOND    │
│ DATASET WITH A PLURALITY OF PROCESSING ELEMENTS         │
│ FORMING A PLURALITY OF LOGICAL ROWS OF A                │
│ MULTIDIMENSIONAL PROCESSING ARRAY AND A PLURALITY OF    │
│ LOGICAL COLUMNS OF THE MULTIDIMENSIONAL                 │
│ PROCESSING ARRAY 1002                                   │
└─────────────────────────────────────────────────────────┘
                            │
                            ▼
┌─────────────────────────────────────────────────────────┐
│ PROVIDING A SWITCH CONTROL VALUE TO A PROCESSING        │
│ ELEMENT OF THE PLURALITY OF PROCESSING ELEMENTS 1004    │
└─────────────────────────────────────────────────────────┘
                            │
                            ▼
┌─────────────────────────────────────────────────────────┐
│ SWITCHING A SWITCH OF THE PROCESSING ELEMENT OF THE     │
│ PLURALITY OF PROCESSING ELEMENTS TO SELECTIVELY         │
│ SOURCE, FROM EITHER OF AN OUTPUT FOR THE FIRST          │
│ DATASET FROM AN UPSTREAM PROCESSING ELEMENT OF THE      │
│ PLURALITY OF PROCESSING ELEMENTS AND A BOUNDARY         │
│ CONDITION VALUE FOR THE SECOND DATASET STORED IN THE    │
│ PROCESSING ELEMENT, BASED ON THE SWITCH CONTROL         │
│ VALUE PROVIDED TO THE PROCESSING ELEMENT 1006           │
└─────────────────────────────────────────────────────────┘
```

FIG. 10

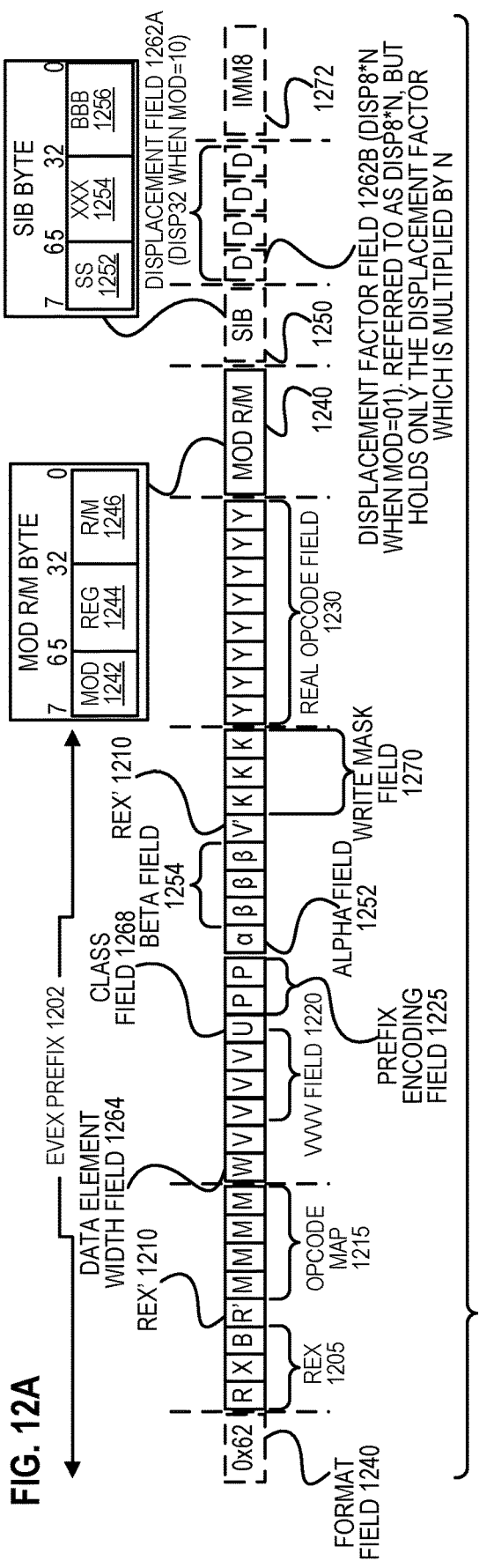
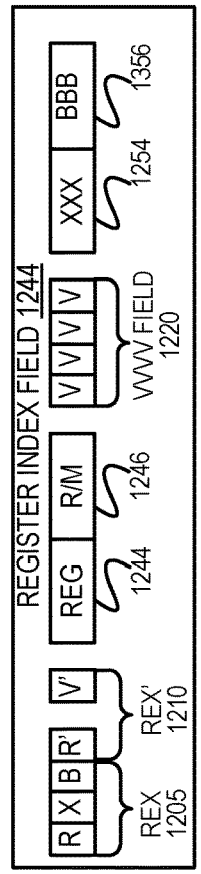
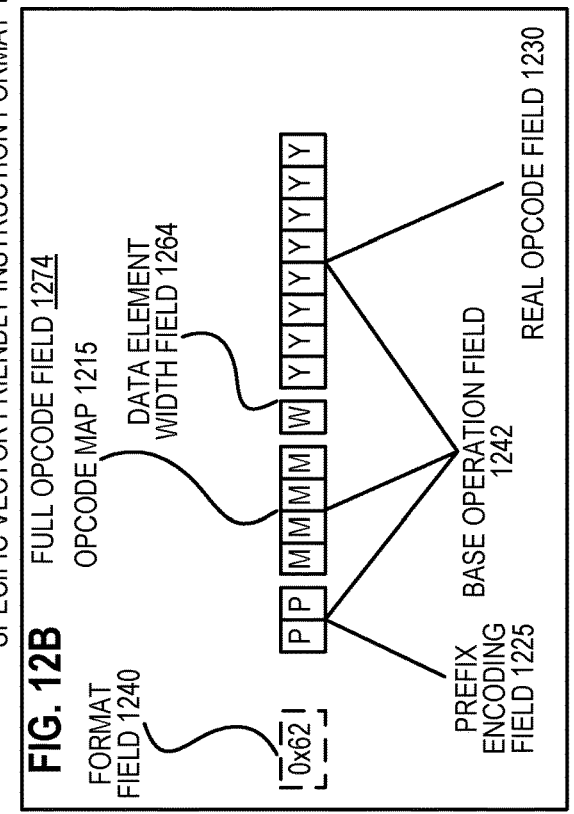
FIG. 12A
FIG. 12B
FIG. 12C

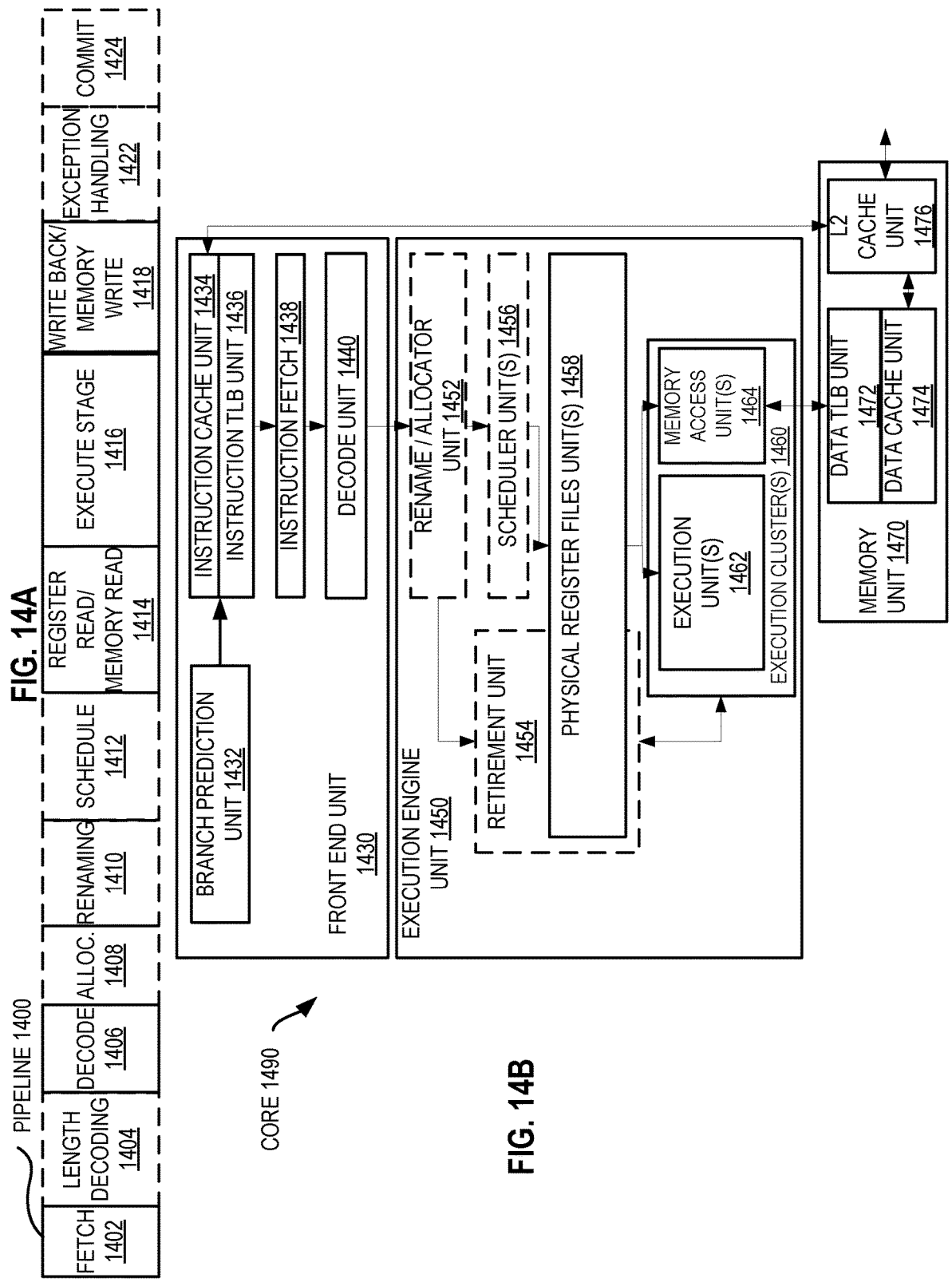

HARDWARE ACCELERATORS AND METHODS FOR OUT-OF-ORDER PROCESSING

TECHNICAL FIELD

The disclosure relates generally to electronics, and, more specifically, an embodiment of the disclosure relates to a hardware accelerator for out-of-order processing.

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The present disclosure is illustrated by way of example and not limitation in the figures of the accompanying drawings, in which like references indicate similar elements and in which:

FIG. 10 illustrates a flow diagram according to embodiments of the disclosure.

FIG. 12A is a block diagram illustrating fields for the generic vector friendly instruction formats in FIGS. 11A and 11B according to embodiments of the disclosure.

FIG. 12B is a block diagram illustrating the fields of the specific vector friendly instruction format in FIG. 12A that make up a full opcode field according to one embodiment of the disclosure.

FIG. 12C is a block diagram illustrating the fields of the specific vector friendly instruction format in FIG. 12A that make up a register index field according to one embodiment of the disclosure.

FIG. 14A is a block diagram illustrating both an exemplary in-order pipeline and an exemplary register renaming, out-of-order issue/execution pipeline according to embodiments of the disclosure.

FIG. 14B is a block diagram illustrating both an exemplary embodiment of an in-order architecture core and an exemplary register renaming, out-of-order issue/execution architecture core to be included in a processor according to embodiments of the disclosure.

DETAILED DESCRIPTION

In the following description, numerous specific details are set forth. However, it is understood that embodiments of the disclosure may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. In one embodiment, a processor is coupled to an (e.g., on die or off die) accelerator (e.g., an offload engine) to perform one or more (e.g., offloaded) operations, for example, instead of those operations being performed only on the processor. In one embodiment, a processor includes an (e.g., on die or off die) accelerator (e.g., an offload engine) to perform one or more operations, for example, instead of those operations being performed only on the processor. A non-limiting example of operations are one or more of the operations performed to identify differences between deoxyribonucleic acid (DNA) sequences (e.g., variant discovery). In one embodiment, an accelerator performs an operation in response to a request for a processor (e.g., a central processing unit (CPU)) to perform that operation. An accelerator may be a hardware accelerator (e.g., accelerator circuit). An accelerator may couple to a data storage device (e.g., on die with an accelerator or off die) to store data, e.g., the input data and/or the output data. In one embodiment, an accelerator couples to an input data storage device (e.g., input buffer) to load input therefrom. In one embodiment, an accelerator couples to an output data storage device (e.g., output buffer) to store output thereon. A processor may execute an instruction to offload an operation or operations (e.g., an instruction, a thread of instructions, or other work) to an accelerator.

Figure 1:
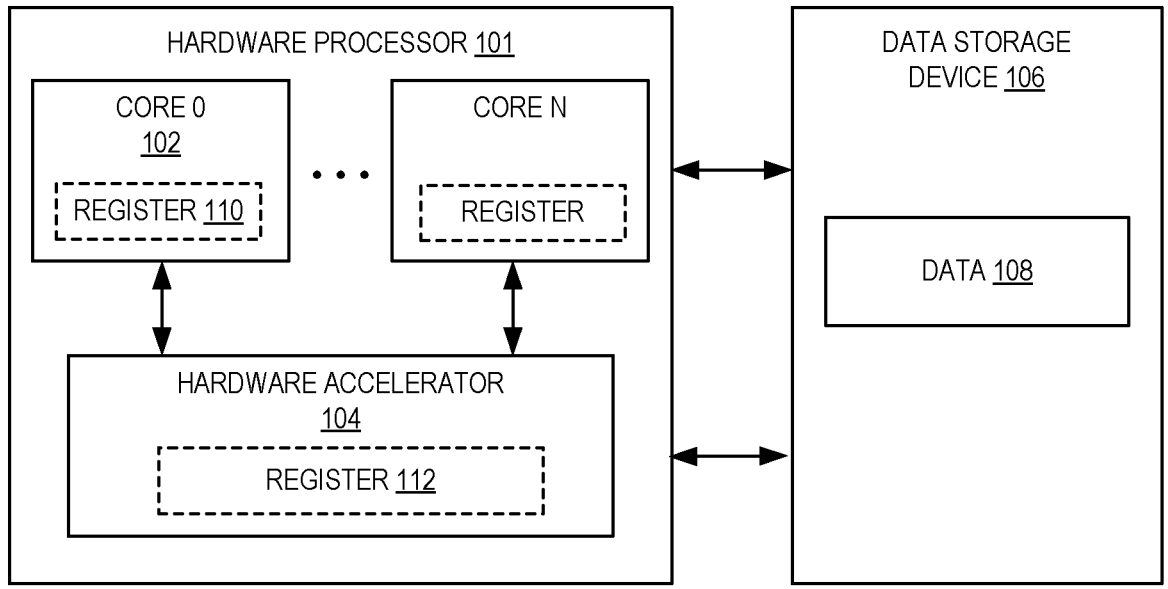
FIG. 1 illustrates a hardware processor with a hardware accelerator according to embodiments of the disclosure.

FIG. 1 illustrates a hardware processor 101 with a hardware accelerator 104 according to embodiments of the disclosure. Depicted hardware processor 101 (e.g., accelerator 104 and/or core(s) thereof) are coupled to a data storage device 106 (e.g., memory). In one embodiment, memory is dynamic random access memory (DRAM), private (e.g., private to an accelerator) random access memory (RAM), cache memory, or system memory. In one embodiment, a section of memory is private an accelerator. Although a single hardware accelerator 104 is depicted, a plurality of hardware accelerators (e.g., 0 to M) may be utilized. Although a plurality of cores are depicted, a single core may be utilized, e.g., core 0 (102). A hardware accelerator may be a multidimensional processing array, e.g., as implemented by a plurality of processing elements.

A processor 101 (e.g., core 102) may receive a request (e.g., from software) to perform an operation and may offload (e.g., at least part of) the operation (e.g., thread) to hardware accelerator 104. Cores, accelerator(s), and data storage device 106 may communicate (e.g., be coupled) with each other. Arrows indicate two way communication (e.g., to and from a component), but one way communication may be used. In one embodiment, a (e.g., each) core may communicate (e.g., be coupled) with the data storage device 106, e.g., to access data 108. In one embodiment, an (e.g., each) accelerator may communicate (e.g., be coupled) with the data storage device 106, e.g., to access data 108. Data 108 may be multiple datasets, e.g., where each dataset includes multiple arrays (e.g., data sequences). Data 108 may be DNA data (e.g., as discussed in reference to FIGS. 7-9). In the depicted embodiment, hardware accelerator 104 is within hardware processor 101. Hardware accelerator 104 may include any of the circuitry discussed herein. Hardware processor 101 may include one or more registers (e.g., register 110 separate from hardware accelerator 104). In certain embodiments, each core includes its own register or set of registers. Register 110 may store DNA data (e.g., as discussed in reference to FIGS. 7-9). Hardware accelerator 104 may include one or more registers, e.g., register 112 separate from core(s). Register 112 may store DNA data (e.g., as discussed in reference to FIGS. 7-9). Register 112 of hardware accelerator 104 may be loaded with data (e.g., by a core or cores of hardware processor 101), for example, prior to the hardware accelerator 104 performing the offloaded operation.

Figure 2:
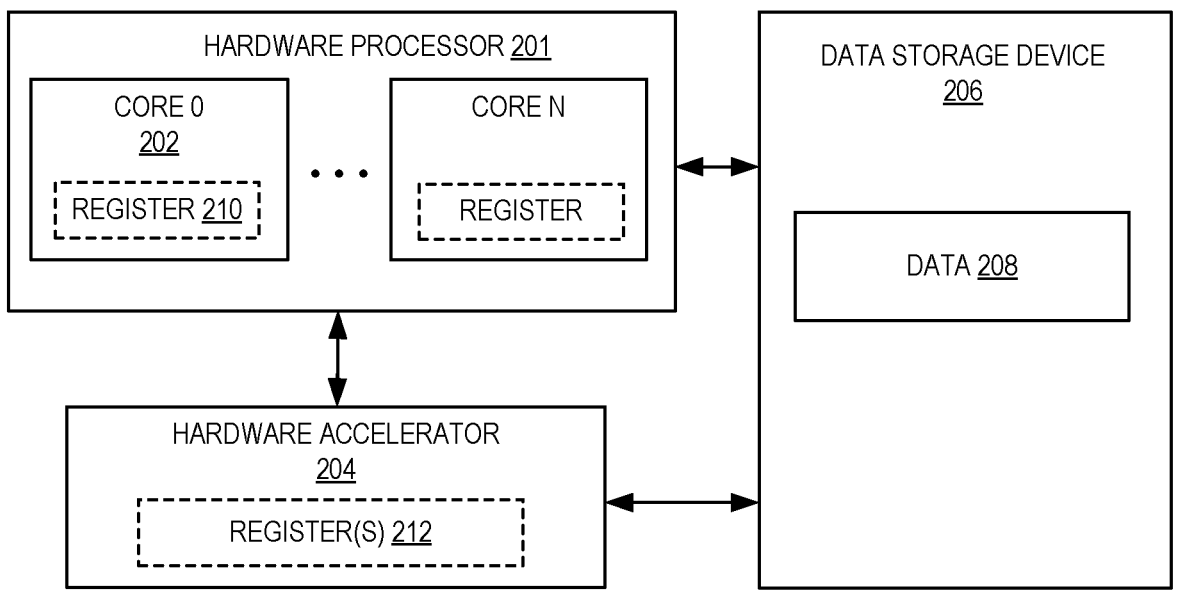
FIG. 2 illustrates a system including a hardware processor and a hardware accelerator according to embodiments of the disclosure.

FIG. 2 illustrates a system 200 including a hardware processor 201 and a hardware accelerator 204 according to embodiments of the disclosure. In one embodiment, hardware accelerator 204 is on die with hardware processor 201. In one embodiment, hardware accelerator 204 is off die of hardware processor 201. In one embodiment, system 200 including at least hardware processor 201 and hardware accelerator 204 are a system-on-a-chip (SOC). Hardware processor 201 (e.g., core 202) may receive a request (e.g., from software) to perform a (e.g., DNA comparison) thread (e.g., operation) and may offload (e.g., at least part of) the thread (e.g., operation) to a hardware accelerator (e.g., hardware accelerator 204). Hardware processor 201 may include one or more cores (0 to N). In one embodiment, each core may communicate with (e.g., be coupled to) hardware accelerator 204. In one embodiment, each core may communicate with (e.g., be coupled to) one of multiple hardware accelerators. Core(s), accelerator(s), and data storage device 206 may communicate (e.g., be coupled) with each other. Arrows indicate two way communication (e.g., to and from a component), but one way communication may be used. In one embodiment, a (e.g., each) core may communicate (e.g., be coupled) with the data storage device 206, for example, to access (e.g., load and/or store) data 208. In one embodiment, an (e.g., each) accelerator 204 may communicate (e.g., be coupled) with the data storage device 206, for example, to access (e.g., load and/or store) data 208. Data 208 may be DNA data (e.g., as discussed in reference to FIGS. 7-9). Hardware accelerator 204 may include any of the circuitry discussed herein. Hardware processor 201 may include one or more registers (e.g., register 210). In certain embodiments, each core includes its own register or set of registers. Register 210 may store DNA data (e.g., as discussed in reference to FIGS. 7-9). Hardware accelerator 204 may include one or more registers (e.g., register 212). Register 212 may store DNA data (e.g., as discussed in reference to FIGS. 7-9). Register 212 of hardware accelerator 204 may be loaded with data (e.g., by hardware processor 201), for example, prior to the hardware accelerator 204 performing the offloaded operation. Hardware accelerators may be provided for a particular DNA comparison. Certain operations (e.g., certain DNA comparisons) are performed by a (e.g., logical) multidimensional processing array (e.g., systolic array) formed by a plurality of coupled (e.g., interconnected) processing elements. In certain embodiments, execution of operations in a multidimensional processing array is caused by the arrival of new data, e.g., instead of executing according to an incremented program counter (e.g., instruction pointer).

Figure 3:
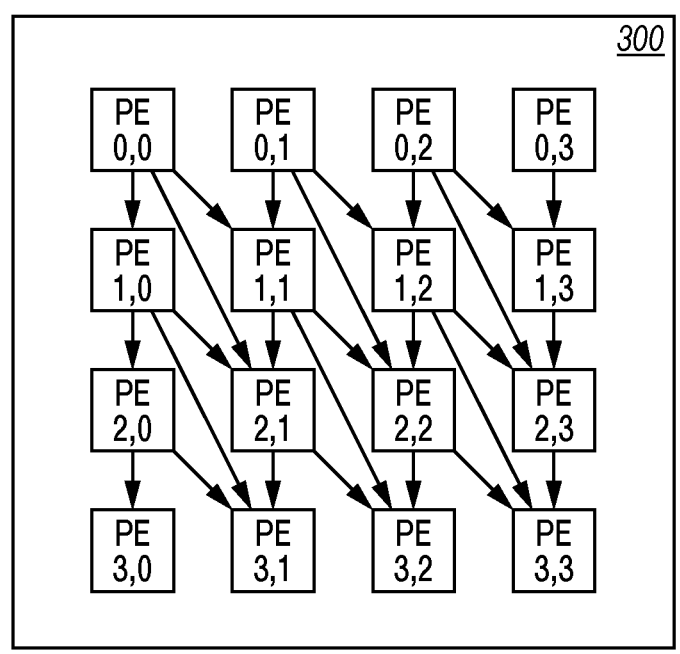
FIG. 3 illustrates a multidimensional processing array according to embodiments of the disclosure.

FIG. 3 illustrates a multidimensional processing array 300 according to embodiments of the disclosure. Depicted multidimensional processing array 300 includes sixteen processing elements with four processing elements in each logical row (horizontal in the depicted orientation) and four processing elements in each logical column (vertical in the depicted orientation), however other embodiments may use any number of rows and/or columns. In the depicted embodiment, each processing element (P.E.) is labeled according to its (e.g., logical) row and (e.g., logical) column number (row, column) with an index starting at zero, for example, with PE (2, 1) being the PE in the third row down and the second column from the left. As shown in FIG. 3, the upstream PEs provide their outputs as inputs to one or more of the downstream PEs, for example, PE (1, 1) providing its output as inputs to PE (2, 1), PE (2, 2), and PE (3, 2). In certain embodiments, a PE may be coupled to any PE (or proper subset of PEs). In one embodiment, the first row and/or first column of PEs are provided with initial input data (e.g., including boundary conditions) and the resulting output is provided as inputs to other (e.g., downstream) PEs such that the data cascades through the other (e.g., downstream) PEs, for example, outputs provided from PEs in a previous row and diagonals.

Figure 4:
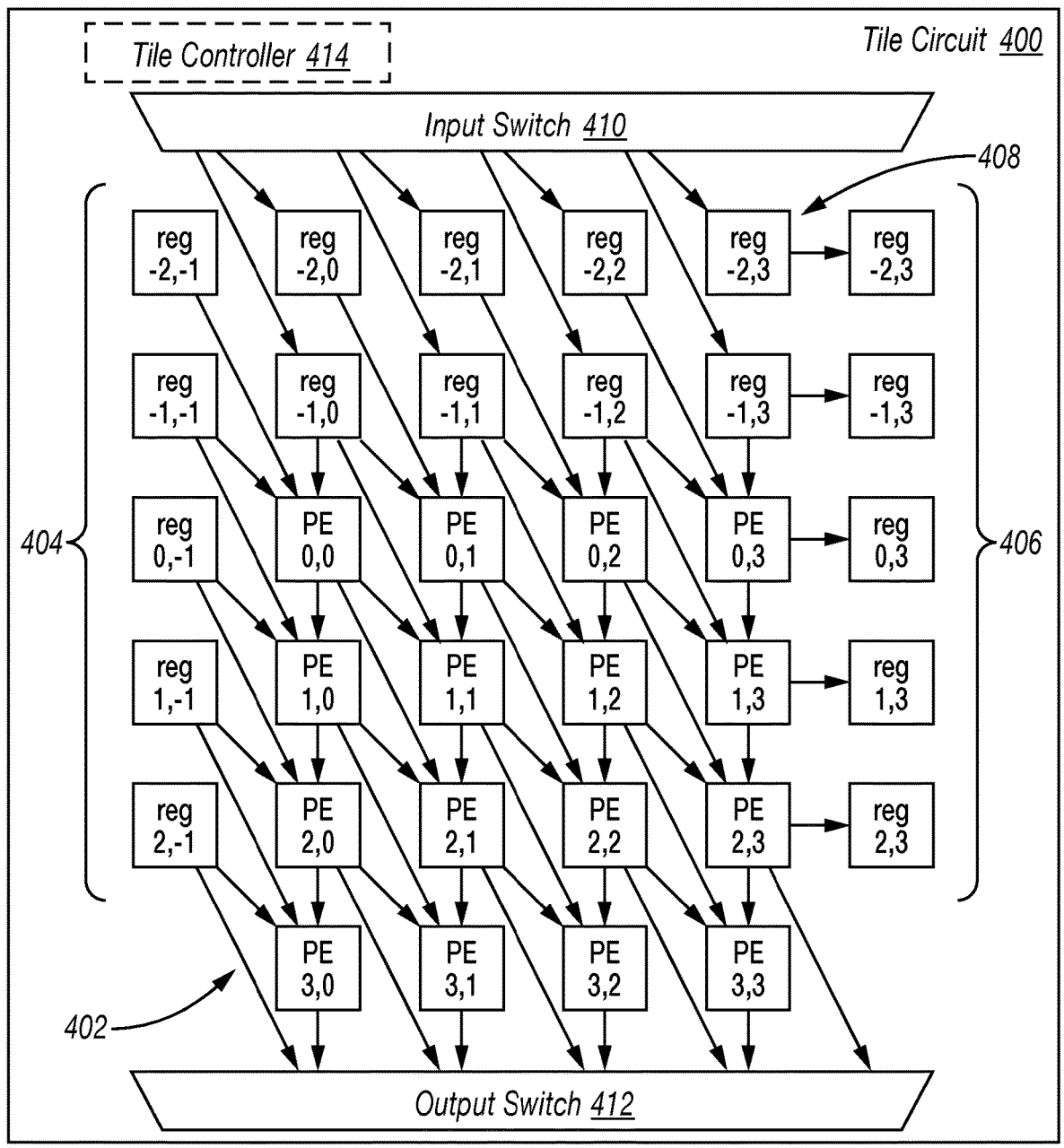
FIG. 4 illustrates a tile circuit including a multidimensional processing array according to embodiments of the disclosure.

FIG. 4 illustrates a tile circuit 400 including a multidimensional processing array 402 according to embodiments of the disclosure. In certain embodiments, multidimensional processing array 402 is multidimensional processing array 300 from FIG. 3. Tile circuit 400 (e.g., formed from a single chip) includes a (e.g., five element) storage 404 to input data into the processing elements that form a first (e.g., logical) column of multidimensional processing array 402. In certain embodiments, each element of a (e.g., vector) storage 404 is a single register. In other embodiments, each element of a (e.g., vector) storage 404 is a respective, separate register. Tile circuit 400 (e.g., formed from a single chip) includes a (e.g., eight element) storage 408 to input data into the processing elements that form a first and second (e.g., logical) row of multidimensional processing array 402. In certain embodiments, each element of a (e.g., vector) storage 408 is a single register. In other embodiments, each element of a (e.g., vector) storage 408 is a respective, separate register. In one embodiment, each element of a (e.g., vector) storage 404 and (e.g., vector) storage 408 are in a single (e.g., input) register. Tile circuit 400 (e.g., formed from a single chip) includes a (e.g., five element) storage 406 to store data output from the processing elements that form a (e.g., proper subset of the) last (e.g., logical) column of multidimensional processing array 402 and/or a proper subset of elements from (e.g., input) storage 408. In certain embodiments, each element of a (e.g., vector) storage 404 is a single register. In other embodiments, each element of a (e.g., vector) storage 404 is a respective, separate register. Although the multidimensional processing arrays are depicted as having a same number of rows and columns, in other embodiments, multidimensional processing arrays have a different number of rows than the number of columns. In certain embodiments, the data from storage 406 is stored into storage 404, for example, the outputs looped back as inputs.

In the depicted embodiment, each processing element (P.E.) and register (e.g., register element) is labeled according to its (e.g., logical) row and (e.g., logical) column number (row, column) with an index starting at zero, for example, with PE (2, 1) being the PE in the third row down and the second column from the left. As shown in FIG. 4, the upstream PEs provide their outputs as inputs to one or more of the downstream PEs, for example, PE (1, 1) providing its output as inputs to PE (2, 1), PE (2, 2), and PE (3, 2). As shown in FIG. 4, the upstream storage elements provide their data as inputs to one or more of the downstream PEs, for example, storage element (Reg) (−1, 0) providing its data as inputs to PE (0, 0), PE (0, 1), and PE (1, 1).

In certain embodiments, input switch (e.g., multiplexer) 410 is to source input data (e.g., one or more arrays of data). In one embodiment, input switch 410 receives and steers input data from a processor (e.g., core), register, and/or data storage device (e.g., system memory). In certain embodiments, output switch (e.g., multiplexer) 412 is to steer output data (e.g., one or more arrays of data). In one embodiment, output switch 412 receives output data from multidimensional processing array 402 and/or storage of tile circuit 400 (e.g., reg (2, −1)) and provides is to a processor (e.g., core), register, and/or data storage device (e.g., system memory). Optional tile controller 414 may be included to provide the control for the tile circuit 400, for example, to provide the control values to input switch 410 and/or output switch 412 and/or to send data from storage 406 into storage 404. In certain embodiments (e.g., when processing large datasets), data that is output from output switch 412 is stored in storage (e.g., storage other than the registers shown in FIG. 4) and the data may then be fed back in from that storage via input switch 410 at the appropriate time, for example, as decided by tile controller 414. In one embodiment, data from output switch 412 is stored in data storage device 106 in FIG. 1 or in data storage device 206 in FIG. 2.

Figure 5:
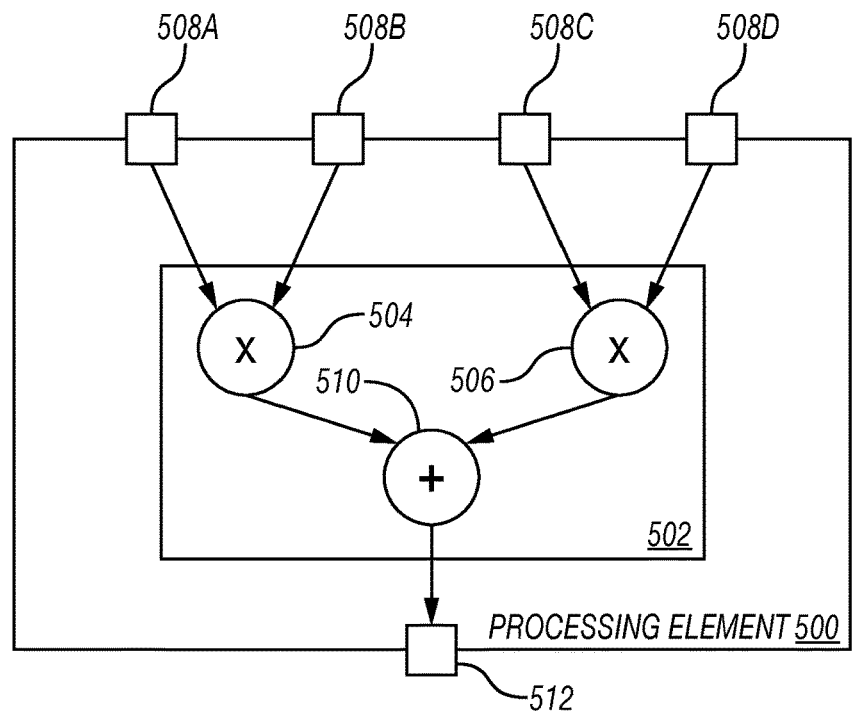
FIG. 5 illustrates a processing element according to embodiments of the disclosure.

FIG. 5 illustrates a processing element 500 according to embodiments of the disclosure. Processing element 500 includes execution circuitry 502 (e.g., an arithmetic logic unit (ALU)) to perform one or more operations. Example of operations are a compare operation and a multiply and add operation (e.g., with two multipliers 504, 506 to multiply inputs (508A-508B and 508C-508D, respectively, and an adder 510 to sum together the resultants of the multiplications into a single resultant 512). In one embodiment, the processing element operates on fixed-point numbers. In another embodiment, the processing element operates on floating-point numbers. In certain embodiments, one or more of the processing elements (e.g., all of the processing elements) in the multidimensional processing array 300 of FIG. 3 or the multidimensional processing array 402 of FIG. 4 are instances of processing element 500. Although four inputs 508A-508D (e.g., ports) are depicted, any plurality of inputs may be utilized.

When implementing certain embodiments of a hardware accelerator having processing elements forming a multidimensional processing array (e.g., a systolic array), keeping the multidimensional processing array active in processing (e.g., instead of being idle or performing no-operations (NOPs)) maximizes the utilization of the hardware accelerator. In certain embodiments, keeping the hardware pipeline of a hardware accelerator full is crucial to maximize the utilization of the hardware accelerator. In one embodiment, the number of bubbles (e.g., NOPs) introduced into the processing elements of the hardware accelerator are minimized to maximizes the utilization of the hardware accelerator.

In one embodiment, separate batches of data (e.g., datasets) are provided to the multidimensional processing array where each batch has a unique set of boundary conditions. However, that embodiment may introduce multiple cycles of no-ops between each batch of data, which reduces the utilization of the hardware accelerator and therefore reduces the efficiency of the hardware accelerator.

Certain embodiments herein provide a processing element design for a (e.g., each) processing element of a multidimensional processing array (e.g., a systolic array) of a hardware accelerator that minimizes or eliminates NOPs in the hardware (E.G., NOPs that would have been used to introduce at least some of the boundary conditions of each unique dataset of multiple datasets being processed by the multidimensional processing array) to increase the utilization of the hardware accelerator and therefore increase the efficiency of the hardware accelerator. For example, in reference to FIGS. 3 and 4, when a dataset is to only utilize less than all (e.g., to utilize two rows and four columns) of the PEs forming the multidimensional processing array, certain embodiments of processing elements only allow for the introduction of boundary conditions at the inputs to the processing elements in the first row and/or first column. In those embodiments, performing operations on two datasets back to back may require starting each dataset on the processing elements in the first row and/or first column (e.g., and not on the subset of processing elements that are not in the first row and/or first column) and thus not utilizing most or all (e.g., only utilizing half in the two row and four column example) of the processing elements forming the multidimensional processing array.

Certain embodiments of processing elements herein include at least one switch to selectively source, from either of an output (e.g., for a first dataset) from an upstream processing element of the plurality of processing elements of a multidimensional processing array and a boundary condition value (e.g., for a second dataset stored in the processing element), for example, based on a switch control value provided to the processing element. Certain embodiments herein add data fields to each dataset that are used (e.g., by a controller) by the processing element to set the boundary conditions (e.g., on the fly) without introducing no-ops into the multidimensional processing array.

Certain embodiments of processing elements herein utilize any combination of: (i) an additional field or fields in the dataset used to indicate the start or stop of each new dataset (e.g., an indication of when to inject a boundary condition) (e.g., an indication that a dataset has a length of one, which means the start and stop happens at the same location), (ii) an additional field or fields in each dataset including the boundary conditions (e.g., or a location of the boundary condition(s) to source and/or data to calculate the boundary conditions) (e.g., switch control value), and (iii) a controller in the processing element to set the boundary conditions on the fly (e.g., without introducing NOPs), with each of these, for example, causing the minimization or elimination of NOPs in the processing elements of a multidimensional processing array.

Figure 6:
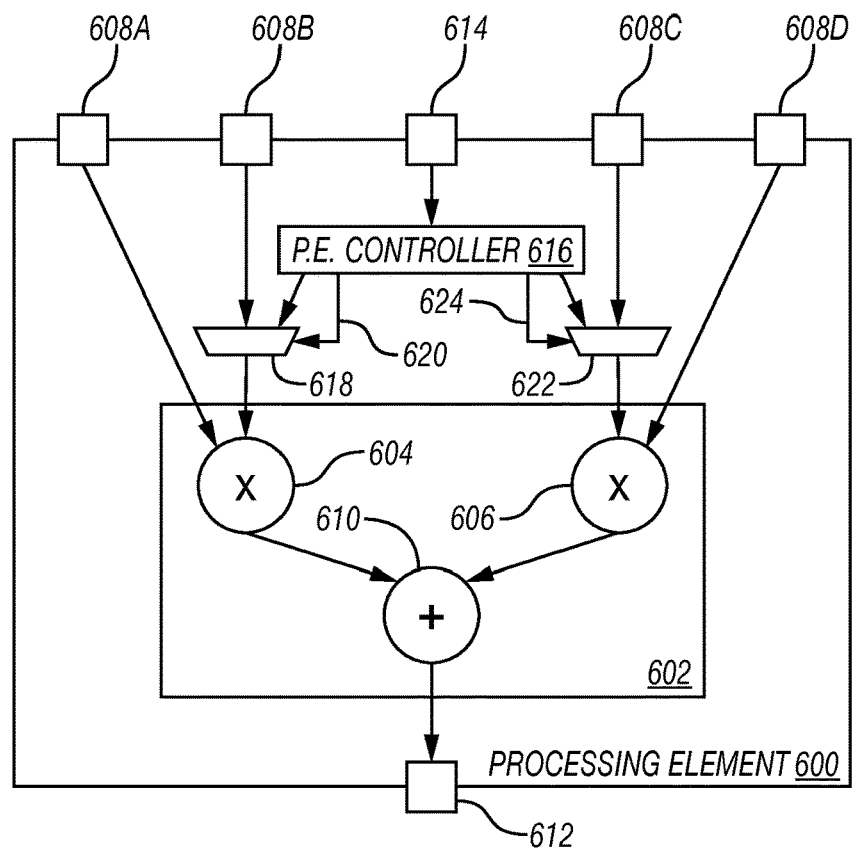
FIG. 6 illustrates a processing element including a plurality of switches to selectively inject boundary condition value(s) according to embodiments of the disclosure.

FIG. 6 illustrates a processing element 600 including a plurality of switches 618, 622 to selectively inject boundary condition value(s) according to embodiments of the disclosure. Although a plurality of switches 618, 622 are depicted, a single switch may be utilized in other embodiments. In the depicted embodiment, processing element 600 includes a boundary control input 614 (e.g., port) to receive data (e.g., along with the data of a dataset that is to be processed by the processing element 600) to selectively inject boundary condition value(s) into the processing. Processing element 600 includes a processing element controller 616 to control the processing element 600.

Depicted processing element 600 includes input 614 to allow (i) a boundary indication value (for example, a high bit or a low bit, e.g., as a switch control value) to be received by the processing element 600 (e.g., from a core offloading an operation to a hardware accelerator including processing element 600) to indicate when to and to not inject the boundary condition value(s) and/or (ii) receipt of the boundary condition value(s) themselves (e.g., from a core offloading an operation to a hardware accelerator including processing element 600), a location of the boundary condition(s) to source, and/or data to calculate the boundary condition(s) (e.g., switch control value). Depicted processing element 600 includes switches 618, 622 to select between outputting the boundary conditions or the data for a dataset (e.g., the array input). In one embodiment, the data for the dataset is the output from an upstream processing element(s) produced for a first dataset or an upstream storage element, for example, the data input into PE (1, 1) in FIG. 3 or 4 being sourced from Reg (−1, 0), PE (0, 0), PE (0, 1), or any combination thereof. As another example, the data input into PE (2, 2) in FIG. 3 or 4 being sourced from PE (0, 1), PE (1, 1), PE (1, 2), or any combination thereof. Depicted processing element 600 includes a processing element controller 616 to store and/or source (i) the boundary condition value(s) and/or (ii) the switch control value(s) for the switches 618, 622.

Processing element 600 includes execution circuitry 602 (e.g., an arithmetic logic unit (ALU)) to perform one or more operations. Example of operations are a compare operation and a multiply and add operation (e.g., with two multipliers 604, 606 to multiply inputs (608A-608B and 608C-608D, respectively, and an adder 610 to sum together the resultants of the multiplications into a single resultant 612). In one embodiment, the processing element operates on fixed-point numbers. In another embodiment, the processing element operates on floating-point numbers. Although four inputs 608A-608D (e.g., ports) and additional input 614 (e.g., port) are depicted, any plurality of inputs may be utilized.

In certain embodiments, one or more of the processing elements (e.g., all of the processing elements) in the multidimensional processing array 300 of FIG. 3 or the multidimensional processing array 402 of FIG. 4 are instances of processing element 500. For example, a first dataset having its respective boundary conditions may be input into a first row and/or column of a multidimensional processing array, but instead of not being able to input a second dataset having its respective boundary conditions (e.g., different than the boundary conditions for the first dataset), certain embodiments utilizing instances of processing element 600 allow the input of the second dataset having its respective boundary conditions into those processing element(s). Thus, certain embodiments herein allow for the concurrent processing of multiple datasets by the same (e.g., single) multidimensional processing array even when the boundary conditions are different for the datasets.

In certain embodiments, a hardware accelerator includes a plurality (e.g., 4, 6, 8, 10, 12, 14, 16, 18, 20, etc.) of instances of processing element 600 that together logically (e.g., not necessarily physically) form a multidimensional processing array (e.g., the multidimensional processing array 300 of FIG. 3 or the multidimensional processing array 402 of FIG. 4), and receives a request to perform an operation(s). In certain embodiments, the hardware accelerator receives the request from a core or other component separate from the hardware accelerator. In one embodiment, the request includes a dataset to be operated on (e.g., by execution circuitry 602) and an identifier of the dataset. The identifier of the dataset may include (i) the boundary condition value(s) and/or (ii) the switch control value(s) for the switches 618, 622. In one embodiment, a controller (e.g., tile controller 414 in FIG. 4) is to cause a respective value of a dataset to be send to each processing element (e.g., to the utilized input(s) of inputs 608A-608D). As one example, a processing element 600 (e.g., one that is not from the first logical column or first logical row of the multidimensional processing array 300 of FIG. 3 or the multidimensional processing array 402 of FIG. 4) receives (e.g., from a requesting core), a value on its boundary control input 614 that indicates to that processing element that the execution circuitry 602 is to receive a boundary condition value instead of an output from another processing element. In certain embodiments, the boundary condition value (for example, sent by the requesting core, e.g., via boundary control input 614) is stored in the processing element (e.g., within processing element controller 616). As one example, the processing element 600 receives a first value on boundary control input 614 (e.g., a binary one) to cause the controller 616 to send a control value on control lines 620, 624 to switches 618, 622, respectively, to cause the switches to send the boundary condition value(s) to the execution circuitry 602 (e.g., instead of sourcing data from inputs 608C or 608D). In one embodiment, execution circuitry 602 concurrently receives a plurality of boundary condition values as an output from each switch. As one example, the processing element 600 receives a second value on boundary control input 614 (e.g., a binary zero) to cause the controller 616 to send a control value on control lines 620, 624 to switches 618, 622, respectively, to cause the switches to source data from inputs 608C and 608D to the execution circuitry 602 (e.g., instead of sourcing boundary condition value(s)). In one embodiment, execution circuitry 602 receives an output from another (e.g., logically upstream) processing element coupled to input 608C and yet another (e.g., logically upstream) processing element coupled to input 608D.

In certain embodiments, a requester (e.g., core) sends data to (e.g., each) processing element 600 to start processing of a dataset. In one embodiment, the requester (e.g., core) sends the dataset with a value appending (e.g., concatenated) thereto that indicates a start of a new dataset (e.g., a boundary condition) and/or boundary condition value(s). In certain embodiments, the boundary conditions are appended (e.g., by the requestor) to each dataset (e.g., each data item of the dataset). In certain embodiments, the sourcing or not of those boundary conditions is controlled by a boundary indication value provided (e.g., by the requestor) to the processing element 600. In one embodiment, a boundary condition is a starting value (e.g., an initial value) of a dataset (e.g., a zero or other (non-zero) value). In one embodiment, the boundary conditions are based on the size (e.g., the number of elements) in a dataset.

As one example, a requestor (e.g., core) sends data to (e.g., each) processing element 600 for the processing of a first dataset and a second dataset. In one embodiment of this example, multiple instances of processing element 600 of a multidimensional processing array (e.g., multidimensional processing array 300 of FIG. 3 or the multidimensional processing array 402 of FIG. 4) are subdivided into a plurality of proper subsets, for example, proper subset one for first dataset (e.g., the first two rows of PEs in multidimensional processing array 300 of FIG. 3 or the multidimensional processing array 402 of FIG. 4) and proper subset two for second dataset (e.g., the last two rows of PEs in multidimensional processing array 300 of FIG. 3 or the multidimensional processing array 402 of FIG. 4). In this example, the proper subset two of processing elements may be provided with a value that indicates to source the boundary condition value(s) to their execution circuitry 602, for example, instead of sourcing (e.g., intermediate values) data from their inputs 608C or 608D that are coupled to other processing elements (e.g., coupled to the proper subset one of processing elements).

Figure 8:
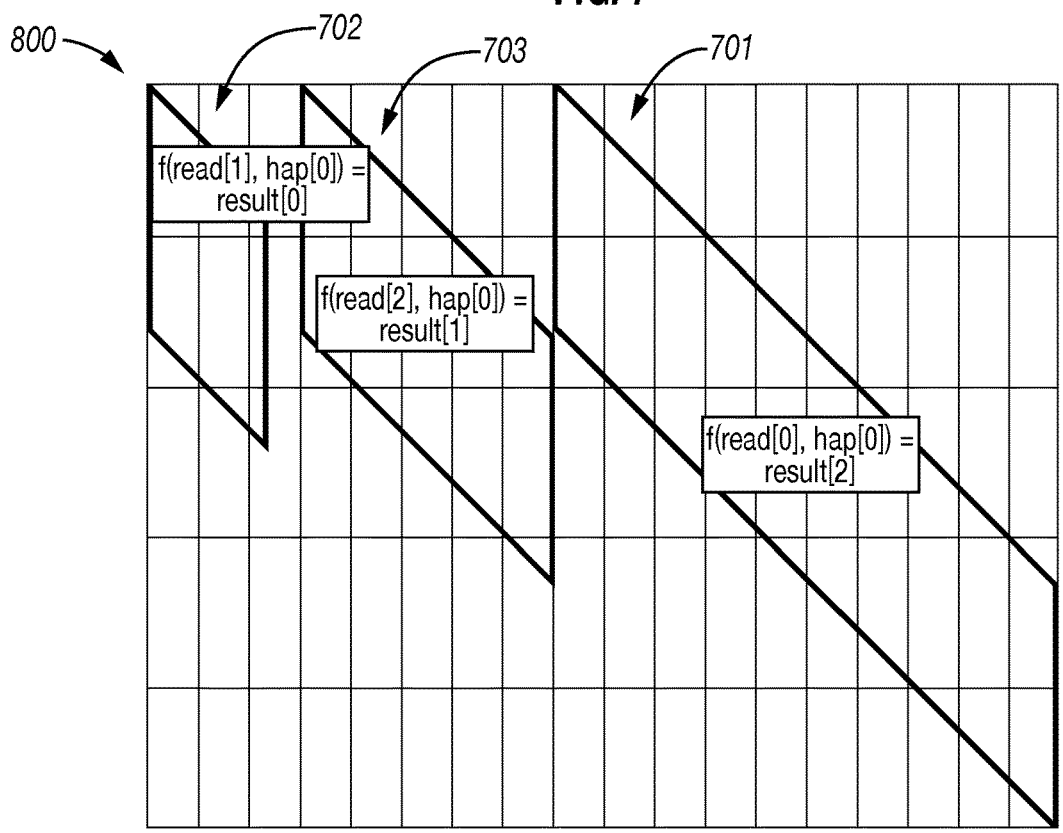
FIG. 8 illustrates a processing graph illustrating utilization of a multidimensional processing array on a first dataset, second dataset, and third dataset from FIG. 7 sorted by size according to embodiments of the disclosure.

When using a hardware accelerator, one challenge may be providing enough data to the accelerator to achieve high accelerator utilization and system throughput. Certain embodiments herein enable higher utilization of hardware accelerators by supporting large batches of data without imposing restrictions on batch contents due to the order of generated results. Certain embodiments herein allow for a processor core (e.g., an application running thereon) to compose (e.g., very large) batches of datasets for acceleration by a hardware accelerator. These datasets can be processed by the hardware accelerator in a back to back fashion without the need to inject no-ops between the datasets to inject boundary conditions. In certain embodiments, this provides greater than about 92% utilization of the multidimensional processing array (e.g., systolic array) of a hardware accelerator, including time to prepare and transfer the data to the hardware accelerator. In one embodiment, batches of datasets are re-ordered in a way to guarantee dataset results are generated in a predefined (e.g., DNA sequence) order. However, that may result in smaller batches of datasets, lower utilization of a hardware accelerator, as well as incurring overhead time and energy to prepare batches that generate results in order (e.g., sorting the datasets by the increasing size of each dataset as shown in FIG. 8).

Additionally or alternatively to utilizing the circuitry discussed above, certain embodiments herein utilize a progress value (e.g., a boundary value) to track progress by a multidimensional processing array on each of a plurality of datasets and/or an index value to indicate each dataset's relative position in a batch. In one embodiment, a plurality of index values are utilized to identify each input sequence of a plurality of input sequences in a batch.

In one embodiment, a hardware accelerator uses the progress value (e.g., boundary value) to determine when a result is valid and sends the result (e.g., and index(es)) as an output of the accelerator. In one embodiment, the output of the accelerator is sent to the core, for example, for the core (e.g., software executing on the core) to computes the in-order index and place the result in the correct position of the result array for the batch.

Certain embodiments herein enable high utilization of a hardware accelerator with fewer restrictions on the requester (e.g., software) that uses the accelerator. Certain embodiments herein provide an optimized hardware accelerator with close to ideal achievable utilization. Certain embodiments herein provide a simplified hardware acceleration user experience and reduced software (e.g., application code) complexity for utilizing a hardware accelerator.

The below discussion is described in reference to a hardware accelerator for accelerating a DNA comparison, however it should be understood that the embodiments herein may be used for other acceleration utilizations. More particularly, the below discussion is for the comparison of two gene sequences that each can have insertions, deletions, and mutations with the pair hidden Markov model (PairHMM) algorithm. In one embodiment, the hidden Markov models in the PairHMM algorithm calculate the probability of a match with these possible changes. The two gene sequences are examples of a first input sequence and a second input sequence for a dataset. In one embodiment, the first gene sequence is a read sequence (e.g., which contains the gene string and some quality factors based on how it was read in) and the second gene sequence is the haplotype sequence (e.g., which is a gene string without any additional data). In certain embodiments herein, the hardware accelerator implements the PairHMM hidden Markov model equation to compare the sequences and the result is passed to the next diagonal, and the next diagonal compares the same two sequences again with a different alignment (e.g., where the different alignment is a shift in sequence by one for each diagonal). In certain embodiments, a hardware accelerator processes batches of input data that include a number of sequences (e.g., arrays) of read data (numR) and a number of sequences (e.g., arrays) of haplotype data (numH). In one embodiment, a PairHMM result is computed for each read and haplotype pair in the batch, which generates numR×numH results for each batch. The example in FIG. 7 illustrates how a batch may be processed by a hardware accelerator.

Figure 7:
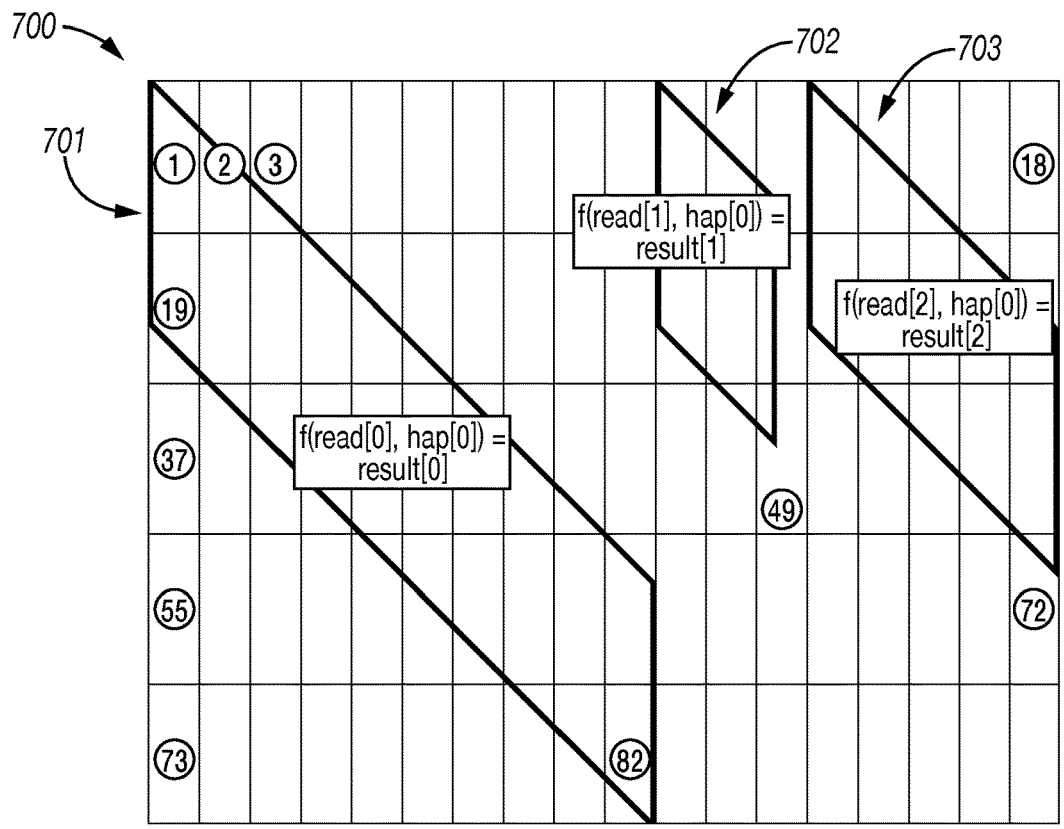
FIG. 7 illustrates a processing graph illustrating utilization of a multidimensional processing array on a first dataset, second dataset, and third dataset according to embodiments of the disclosure.

FIG. 7 illustrates a processing graph 700 illustrating utilization of a multidimensional processing array on a first dataset 701, second dataset 702, and third dataset 703 according to embodiments of the disclosure. The processing graph 700 may be a batch of data, e.g., provided to a hardware accelerator for processing. In one embodiment, the vertical axis of graph 700 depicts first (e.g., haplotype) input sequences and the horizontal axis of graph 700 depicts second (e.g., read) input sequences. In the processing graph 700, each batch is divided into data tiles (rectangles in the figure). In certain embodiments, a data tile is processed from left to right, starting with the top row and moving down from there. The numbers in the circles indicate the order in time in which the data tiles are processed, e.g., starting in the upper left corner with tile 1. In this depicted example, there are three read input sequences (e.g., arrays) (numR=3) and one haplotype input sequence (e.g., array) (numH=1). The expected order of results is result[0], then result[1], and then result[2]. However, in the depicted embodiment, this batch will generate results in the following order: result[1], then result[2], then result[0], which are generated at the time for data tiles 49, 72, and 82, respectively.

As one solution for the embodiment depicted in FIG. 7, the order of the results in a batch is guaranteed by sorting the read input sequences (e.g., arrays) by length so that shorter read input sequences are processed first, and creating numH sub-batches, where each sub-batch contained only one haplotype input sequence (e.g., array). FIG. 8 illustrates the datasets of FIG. 7 sorted to provide the results in the expected order of result[0], then result[1], and then result[2].

FIG. 8 illustrates a processing graph 800 illustrating utilization of a multidimensional processing array on a first dataset 701, second dataset 702, and third dataset 703 from FIG. 7 sorted by size according to embodiments of the disclosure. Here, after the sorting by size, the processing on the second dataset 702 is begun before the processing of third dataset 702, which is begun before the processing of first dataset 701. However, in certain embodiments, processing by a hardware accelerator by datasets sorted by size may cause lower accelerator utilization due to using smaller batch sizes (e.g., fewer datasets in a single batch), additional time and energy usage to sort the input sequences (e.g., read arrays), and/or additional time and energy to retransmit input sequences (e.g., read arrays) used in multiple batches.

Figure 9:
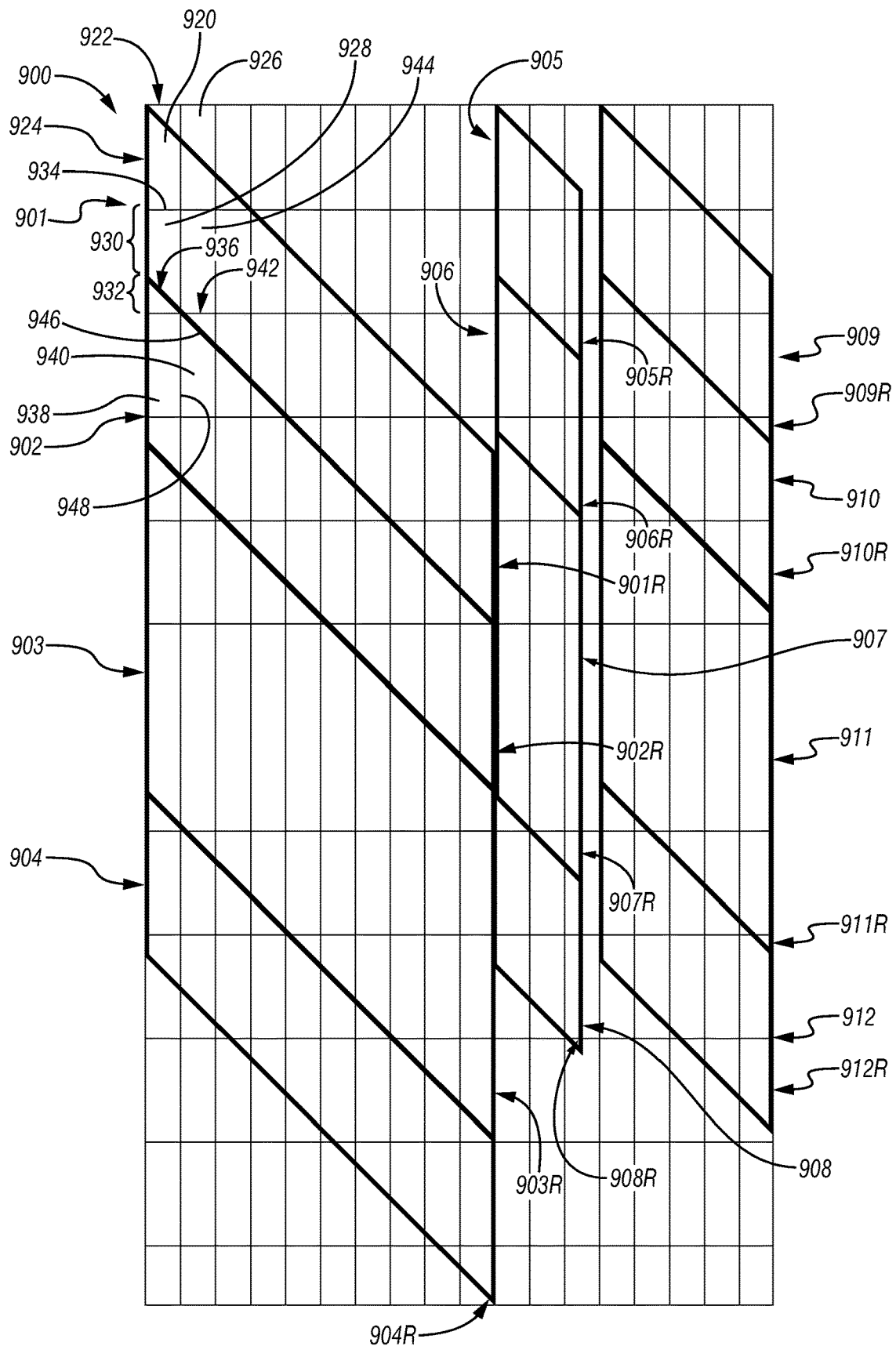
FIG. 9 illustrates a processing graph illustrating utilization of a multidimensional processing array on a first through twelfth dataset according to embodiments of the disclosure.

FIG. 9 illustrates how a processing graph 900 for a hardware accelerator that does not require processing by a hardware accelerator by datasets sorted by size may cause lower accelerator utilization due to using smaller batch sizes (e.g., fewer datasets in a single batch), additional time and energy usage to sort the input sequences (e.g., read arrays), and/or additional time and energy to retransmit input sequences (e.g., read arrays) used in multiple batches.

Certain embodiments herein thus remove the restriction on the order that results are generated, for example, to allow batches to include multiple haplotype data sets (e.g., arrays) (numH>1), e.g., as shown in FIG. 9. As compared to FIG. 7 or FIG. 8, FIG. 9 illustrates that accelerator utilization is higher when numH>1. In certain embodiments herein, batches are larger than depicted in FIG. 9, e.g., with accelerator utilization (e.g., performing operations other that idle or NOPs) greater than 90%.

FIG. 9 illustrates a processing graph 900 illustrating utilization of a multidimensional processing array on a first 901 through twelfth 912 dataset according to embodiments of the disclosure. In certain embodiments, a hardware accelerator implementing processing graph 900 includes a controller (e.g., controller 414 in FIG. 4) that utilizes (e.g., updates and monitors) a progress value (e.g., a boundary value) to track progress by a multidimensional processing array (e.g., multidimensional processing array 402 in FIG. 4) on each of a plurality of datasets. In certain embodiments, a hardware accelerator implementing processing graph 900 includes a controller (e.g., controller 414 in FIG. 4) that utilizes (e.g., appends and monitors) an index value to indicate each dataset's relative position in a batch (e.g., to indicate a particular dataset of a plurality of datasets of a batch). In certain embodiments, a hardware accelerator implementing processing graph 900 includes a controller (e.g., controller 414 in FIG. 4) that sends a result of processing of a dataset (e.g., any result of results 901R-912R) when the processing of the dataset is complete. In one embodiment, the result is sent (e.g., to a requestor) along with a first index identifying the first (e.g., read) input sequence and/or a second index identifying the second (e.g., haplotype) input sequence. In certain embodiments, the requestor is a core of a processor and the core, e.g., software running on the core) is to reorder the out-of-order results returned from the hardware accelerator.

The processing graph 900 may be a batch of data, e.g., provided to a hardware accelerator for processing. In one embodiment, the vertical axis of graph 900 depicts first (e.g., haplotype) input sequences and the horizontal axis of graph 900 depicts second (e.g., read) input sequences. In the processing graph 900, each batch is batch is divided into data tiles (rectangles in the figure). In certain embodiments, a data tile is processed from left to right, starting with the top row and moving down from there.

As one example, a first dataset 901 includes boundary condition value(s) 922 and boundary condition value(s) 924 that are input for data tile 920 into a hardware accelerator (e.g., input into multidimensional processing array 402 in FIG. 4), with the output provided to processing elements of the hardware accelerator (e.g., the output being input back into multidimensional processing array 402 in FIG. 4) for data tile 926. In an embodiment utilizing the processing element 600 of FIG. 6, the hardware accelerator may input boundary condition value(s) 930 for the upper part of data tile 926 for the first dataset 901, different boundary condition value(s) 932 for the lower part of data tile 928 for the second dataset 902, the output 934 from the processing of data tile 920, and/or boundary condition value(s) 936 for the lower part of data tile 928 for the second dataset 902. In another embodiment utilizing the processing element 600 of FIG. 6, the hardware accelerator may input the output 942 from the processing of data tile 944 for the upper part of data tile 940 for the first dataset 901, boundary condition value(s) 946 for the upper part of data tile 940 for the first dataset 901, different boundary condition value(s) 946 for the lower part of data tile 940 for the second dataset 902, and/or the output 948 from the processing of data tile 938.

In certain embodiments, a hardware accelerator (e.g., controller 414 in FIG. 4) tracks the progress made on each dataset (e.g., how far along processing of each of datasets 901-912 are), and sends the respective result (e.g., results 901R-912R) when the processing of that dataset is complete (e.g., at the time corresponding to the processing of that data tile in FIG. 9). For example, keeping track of which data tile is being processed by a processing element or elements (e.g., of multidimensional processing array 402 in FIG. 4).

In certain embodiments, a hardware accelerator (e.g., controller 414 in FIG. 4) tracks which dataset that the data items (e.g., boundary condition values and/or intermediate values as outputs from upstream processing elements) correspond to, for example, which dataset that each result belongs to. In one embodiment, the dataset identifier is a first index identifying which read input sequence (e.g., read array) a result corresponds to and a second index identifying which read haplotype sequence (e.g., haplotype array) the result corresponds to. As one example, the dataset identifier may be in the format of sequence name (read or haplotype) followed by [index value], for example, read[0] and haplotype[0] for dataset 901, read[0] and haplotype[1] for dataset 902, read[0] and haplotype[2] for dataset 903, read[0] and haplotype[3] for dataset 904, read[1] and haplotype[0] for dataset 905, read[1] and haplotype[1] for dataset 906, read[1] and haplotype[2] for dataset 907, read[1] and haplotype[3] for dataset 908, read[2] and haplotype[0] for dataset 909, read[2] and haplotype[1] for dataset 910, read[2] and haplotype[2] for dataset 911, and read[2] and haplotype[3] for dataset 912.

In certain embodiments, when the progress made on a dataset indicates the processing is completed for a data set (e.g., when the boundary fields of a read sequence and haplotype sequence both indicate the end of that dataset), then the hardware accelerator (e.g., via controller 414 in FIG. 4) generates a (e.g., valid) result of that dataset. At this point in one embodiment, the hardware accelerator sends the result, read sequence index, and haplotype sequence index to the requestor (e.g., core). The order of results arriving at the requestor (e.g., core) can be out of order, as shown in Table 1 below, which is based on the batch in FIG. 7.

TABLE 1

Results order of completion

| Order of Arrival | Result | Read Index | Haplotype Index |
|---|---|---|---|
| 0 | result[1] | 1 | 0 |
| 1 | result[2] | 2 | 0 |
| 2 | result[0] | 0 | 0 |

In certain embodiments, the processor (e.g., requesting core) CPU computes the in-order index for each result using the following formula:

$$in\_order\_index = read\_index * numH + haplotype\_index \quad (1)$$

The processor may store each result in a result array using its corresponding in-order index (in_order_index) to complete the reordering process.

Certain embodiments herein include one or more of the following features: (i) a boundary field in each read and haplotype array to indicate the end of the array, (ii) an index field to indicate the position of each read and haplotype array in the batch, (iii) logic circuitry in the hardware accelerator to send the result, read index, and haplotype index back to the processor (e.g., core) for each valid result, and software on the processor to reorder the out-of-order results from the hardware accelerator.

The processor (e.g., and core thereof) may be a processor and/or core according to the disclosure below.

FIG. 10 illustrates a flow diagram 1000 according to embodiments of the disclosure. Depicted flow 1000 includes concurrently processing a first dataset and a second dataset with a plurality of processing elements forming a plurality of logical rows of a multidimensional processing array and a plurality of logical columns of the multidimensional processing array 1002; providing a switch control value to a processing element of the plurality of processing elements 1004; and switching a switch of the processing element of the plurality of processing elements to selectively source, from either of an output for the first dataset from an upstream processing element of the plurality of processing elements or a boundary condition value for the second dataset stored in the processing element, based on the switch control value provided to the processing element 1006.

In one embodiment, an apparatus (e.g., processor) includes a hardware accelerator including a plurality of processing elements coupled to form a plurality of logical rows of a multidimensional processing array and a plurality of logical columns of the multidimensional processing array, wherein a processing element of the plurality of processing elements comprises a switch to selectively source, from either of an output for a first dataset from an upstream processing element of the plurality of processing elements or a boundary condition value for a second dataset stored in (e.g., provided to) the processing element, based on a switch control value provided to the processing element; and a core coupled to the hardware accelerator. The processing element may be in a second logical column and a second logical row of the multidimensional processing array. A second (and/or third) processing element of the plurality of processing elements may include a switch to selectively source, from either of an output from the processing element of the plurality of processing elements or a boundary condition value stored in (e.g., provided to) the second processing element, based on a switch control value provided to the second processing element. The apparatus (e.g., processor) may include at least one register coupled to inputs of a first proper subset of the plurality of processing elements that form a first logical column of the plurality of logical rows of the multidimensional processing array and coupled to outputs of a second proper subset of the plurality of processing elements that form a last logical column of the plurality of logical columns of the multidimensional processing array to provide a result from the outputs of the second proper subset to the inputs of the first proper subset. The apparatus (e.g., processor) may include a controller to track progress by the multidimensional processing array on a first input sequence of the first dataset and a second input sequence of the first dataset, and on a third input sequence of the second dataset and a fourth input sequence of the second dataset. The controller may: on completion of processing both the first input sequence of the first dataset and the second input sequence of the first dataset by the multidimensional processing array, send a first result of the processing of the first input sequence of the first dataset and the second input sequence of the first dataset, a first index identifying the first input sequence, and a second index identifying the second input sequence to the core, and on completion of processing both the third input sequence of the second dataset and the fourth input sequence of the second dataset by the multidimensional processing array, send a second result of the processing of the third input sequence of the second dataset and the fourth input sequence of the second dataset, a third index identifying the third input sequence, and a fourth index identifying the fourth input sequence to the core. When the second result arrives at the core before the first result, the core may use the first index, second index, third index, and fourth index to reorder the first result and the second result. The core may provide the switch control value and the boundary condition value to the processing element.

In another embodiment, a method (e.g., or a non-transitory machine readable medium that stores code that when executed by a machine causes the machine to perform the method) includes concurrently processing a first dataset and a second dataset with a plurality of processing elements forming a plurality of logical rows of a multidimensional processing array and a plurality of logical columns of the multidimensional processing array; providing a switch control value to a processing element of the plurality of processing elements; and switching a switch of the processing element of the plurality of processing elements to selectively source, from either of an output for the first dataset from an upstream processing element of the plurality of processing elements or a boundary condition value for the second dataset stored in the processing element, based on the switch control value provided to the processing element. The processing element may be in a second logical column and a second logical row of the multidimensional processing array. The method may include providing a switch control value to a second processing element of the plurality of processing elements; and switching a switch of the second processing element of the plurality of processing elements to selectively source, from either of an output from the processing element of the plurality of processing elements or a boundary condition value stored in the second processing element, based on the switch control value provided to the second processing element. The method may include sending an intermediate value of the processing of the first dataset or the second dataset from a first proper subset of the plurality of processing elements that form a last logical column of the plurality of logical columns of the multidimensional processing array to a second proper subset of the plurality of processing elements that form a first logical column of the plurality of logical rows of the multidimensional processing array. The method may include tracking progress of the multidimensional processing array on a first input sequence of the first dataset and a second input sequence of the first dataset, and on a third input sequence of the second dataset and a fourth input sequence of the second dataset. The method may include on completion of processing both the first input sequence of the first dataset and the second input sequence of the first dataset by the multidimensional processing array, sending a first result of the processing of the first input sequence of the first dataset and the second input sequence of the first dataset, a first index identifying the first input sequence, and a second index identifying the second input sequence to a processor core coupled to the plurality of processing elements, and on completion of processing both the third input sequence of the second dataset and the fourth input sequence of the second dataset by the multidimensional processing array, sending a second result of the processing of the third input sequence of the second dataset and the fourth input sequence of the second dataset, a third index identifying the third input sequence, and a fourth index identifying the fourth input sequence to the processor core coupled to the plurality of processing elements. The method may include reordering the first result and the second result based on the first index, second index, third index, and fourth index when the second result arrives at the processor core before the first result. The method may include providing the switch control value and the boundary condition value to the processing element from a processor core coupled to the plurality of processing elements.

In yet another embodiment, a hardware accelerator includes a plurality of processing elements coupled to form a plurality of logical rows of a multidimensional processing array and a plurality of logical columns of the multidimensional processing array; wherein a processing element of the plurality of processing elements comprises a switch to selectively source, from either of an output for a first dataset from an upstream processing element of the plurality of processing elements or a boundary condition value for a second dataset stored in the processing element, based on a switch control value provided to the processing element. The processing element may be in a second logical column and a second logical row of the multidimensional processing array. A second (and/or third) processing element of the plurality of processing elements may include a switch to selectively source, from either of an output from the processing element of the plurality of processing elements or a boundary condition value stored in the second processing element, based on a switch control value provided to the second processing element. The hardware accelerator may include at least one register coupled to inputs of a first proper subset of the plurality of processing elements that form a first logical column of the plurality of logical rows of the multidimensional processing array and coupled to outputs of a second proper subset of the plurality of processing elements that form a last logical column of the plurality of logical columns of the multidimensional processing array to provide a result from the outputs of the second proper subset to the inputs of the first proper subset. The hardware accelerator may include a controller to track progress by the multidimensional processing array on a first input sequence of the first dataset and a second input sequence of the first dataset, and on a third input sequence of the second dataset and a fourth input sequence of the second dataset. The controller may: on completion of processing both the first input sequence of the first dataset and the second input sequence of the first dataset by the multidimensional processing array, send a first result of the processing of the first input sequence of the first dataset and the second input sequence of the first dataset, a first index identifying the first input sequence, and a second index identifying the second input sequence as an output of the hardware accelerator, and on completion of processing both the third input sequence of the second dataset and the fourth input sequence of the second dataset by the multidimensional processing array, send a second result of the processing of the third input sequence of the second dataset and the fourth input sequence of the second dataset, a third index identifying the third input sequence, and a fourth index identifying the fourth input sequence as an output of the hardware accelerator. The second result may be sent as the output of the hardware accelerator before the first result is sent as the output of the hardware accelerator. The switch control value and the boundary condition value for the processing element may be inputs into the hardware accelerator.

In another embodiment, a hardware accelerator includes a plurality of processing elements coupled to form a plurality of logical rows of a multidimensional processing array and a plurality of logical columns of the multidimensional processing array; wherein a processing element of the plurality of processing elements comprises means to selectively source, from either of an output for a first dataset from an upstream processing element of the plurality of processing elements or a boundary condition value for a second dataset stored in the processing element, based on a value provided to the processing element.

In yet another embodiment, an apparatus comprises a data storage device that stores code that when executed by a hardware processor causes the hardware processor to perform any method disclosed herein. An apparatus may be as described in the detailed description. A method may be as described in the detailed description.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, May 2018; and see Intel® Architecture Instruction Set Extensions Programming Reference, May 2018).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 11A:
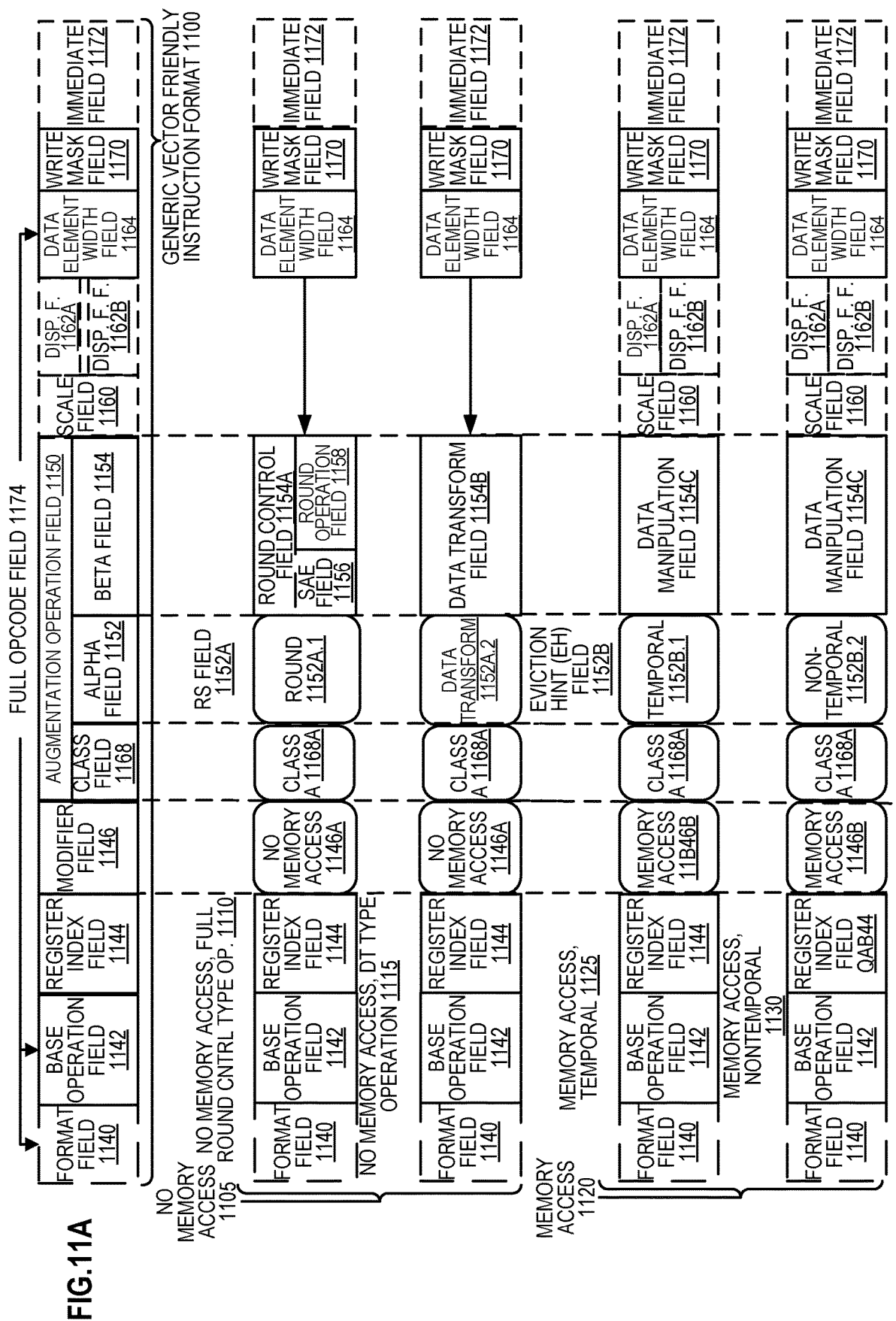
FIG. 11A is a block diagram illustrating a generic vector friendly instruction format and class A instruction templates thereof according to embodiments of the disclosure.
Figure 11B:
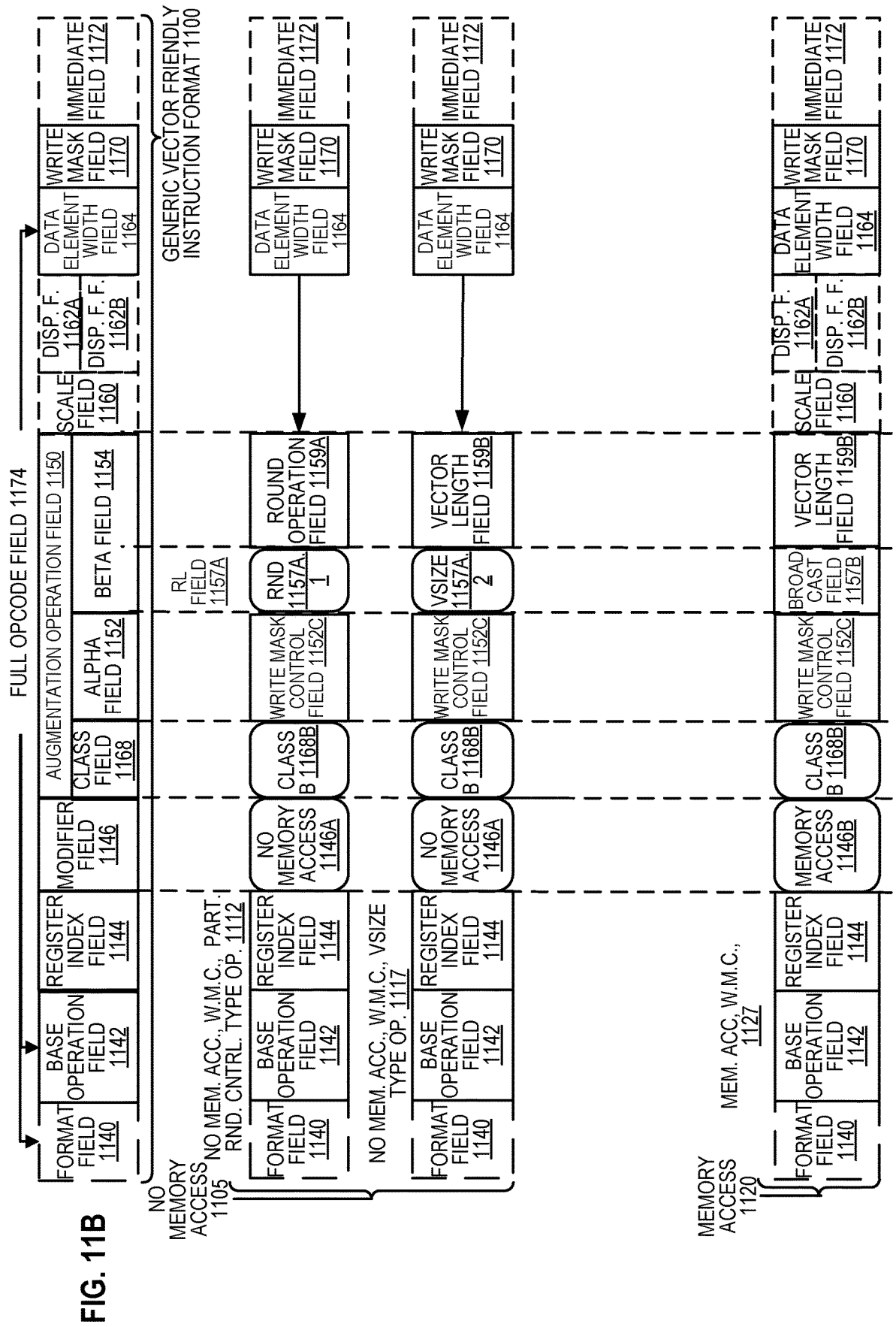
FIG. 11B is a block diagram illustrating the generic vector friendly instruction format and class B instruction templates thereof according to embodiments of the disclosure.

FIGS. 11A-11B are block diagrams illustrating a generic vector friendly instruction format and instruction templates thereof according to embodiments of the disclosure. FIG. 11A is a block diagram illustrating a generic vector friendly instruction format and class A instruction templates thereof according to embodiments of the disclosure; while FIG. 11B is a block diagram illustrating the generic vector friendly instruction format and class B instruction templates thereof according to embodiments of the disclosure. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the disclosure, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}$*index+base).

Displacement Field 1162A—its content is used as part of memory address generation (e.g., for address generation that uses $2^{scale}$*index+base+displacement).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses $2^{scale}$*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the disclosure are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-B, the contents of this field select between class A and class B instructions. In FIGS. 11A-B, rounded corner squares are used to indicate a specific value is present in a field (e.g., class A 1168A and class B 1168B for the class field 1168 respectively in FIGS. 11A-B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale filed 1162B are not present.

No-Memory Access Instruction Templates—Full Round Control Type Operation

In the no memory access full round control type operation 1110 instruction template, the beta field 1154 is interpreted as a round control field 1154A, whose content(s) provide static rounding. While in the described embodiments of the disclosure the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). Thus, the round operation control field 1158 allows for the changing of the rounding mode on a per instruction basis. In one embodiment of the disclosure where a processor includes a control register for specifying rounding modes, the round operation control field's 1150 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale filed 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the disclosure where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12 is a block diagram illustrating an exemplary specific vector friendly instruction format according to embodiments of the disclosure. FIG. 12 shows a specific vector friendly instruction format 1200 that is specific in the sense that it specifies the location, size, interpretation, and order of the fields, as well as values for some of those fields. The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 11 into which the fields from FIG. 12 map are illustrated.

It should be understood that, although embodiments of the disclosure are described with reference to the specific vector friendly instruction format 1200 in the context of the generic vector friendly instruction format 1100 for illustrative purposes, the disclosure is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the disclosure is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0×62 (the unique value used for distinguishing the vector friendly instruction format in one embodiment of the disclosure).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]-R), EVEX.X bit field (EVEX byte 1, bit [6]-X), and 1157 BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1110—this is the first part of the REX' field 1110 and is the EVEX.R' bit field (EVEX Byte 1, bit [4]-R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]-mmmm)—its content encodes an implied leading opcode byte (OF, OF 38, or OF 3).

Data element width field 1164 (EVEX byte 2, bit [7]-W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]-EH; also known as EVEX.EH, EVEX.rs, EVEX.RL, EVEX.write mask control, and EVEX.N; also illustrated with α)—as previously described, this field is context specific.

Beta field 1154 (EVEX byte 3, bits [6:4]-SSS, also known as EVEX.$s_{2-0}$, EVEX.$r_{2-0}$, EVEX.rrl, EVEX.LL0, EVEX.LLB; also illustrated with βββ)—as previously described, this field is context specific.

REX' field 1110—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1150 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)—when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 12B is a block diagram illustrating the fields of the specific vector friendly instruction format 1200 that make up the full opcode field 1174 according to one embodiment of the disclosure. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 1200 that make up the register index field 1144 according to one embodiment of the disclosure. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
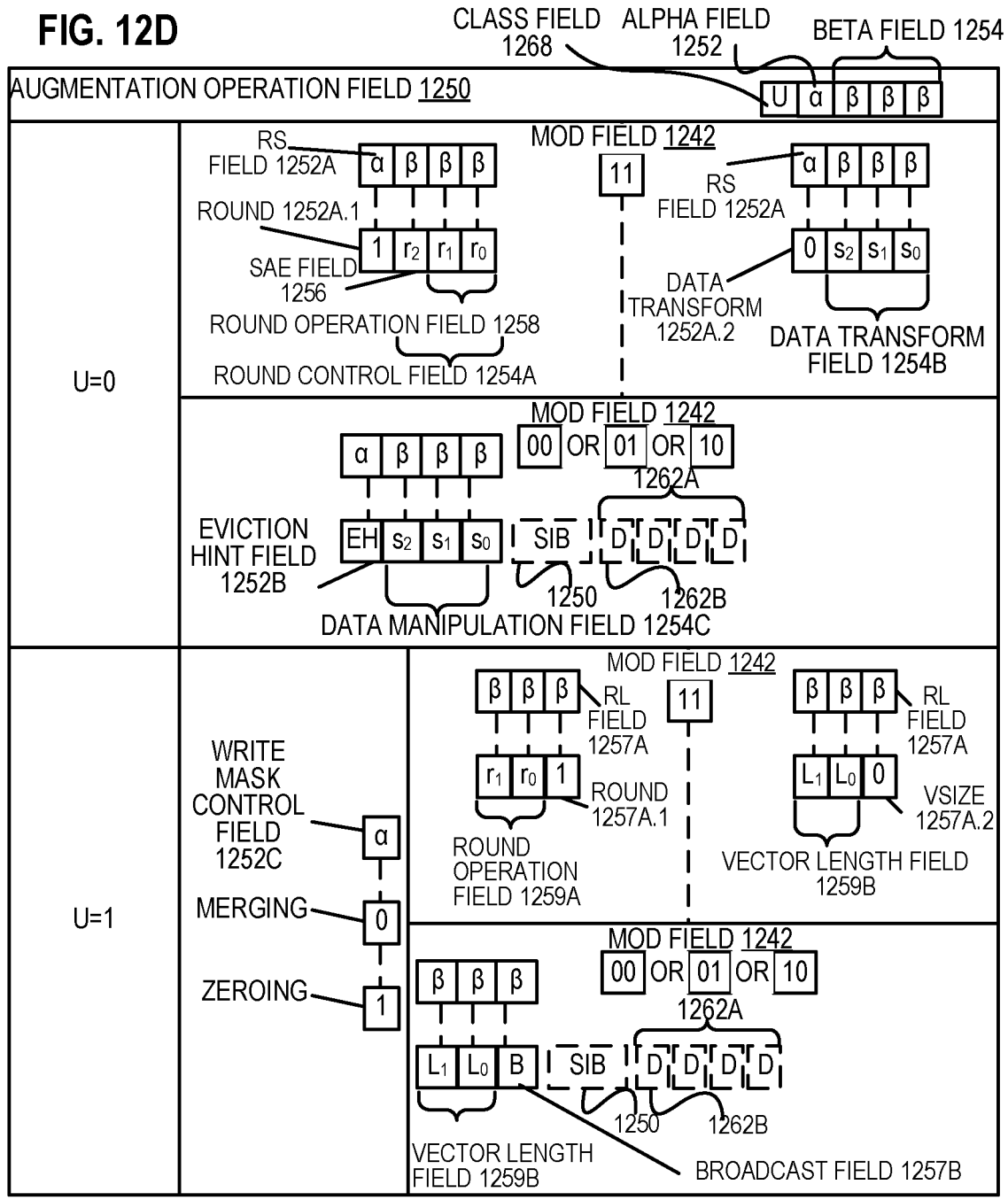
FIG. 12D is a block diagram illustrating the fields of the specific vector friendly instruction format in FIG. 12A that make up the augmentation operation field 1150 according to one embodiment of the disclosure.

FIG. 12D is a block diagram illustrating the fields of the specific vector friendly instruction format 1200 that make up the augmentation operation field 1150 according to one embodiment of the disclosure. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]-EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]-EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]-EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-$S_{2-1}$) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 13:
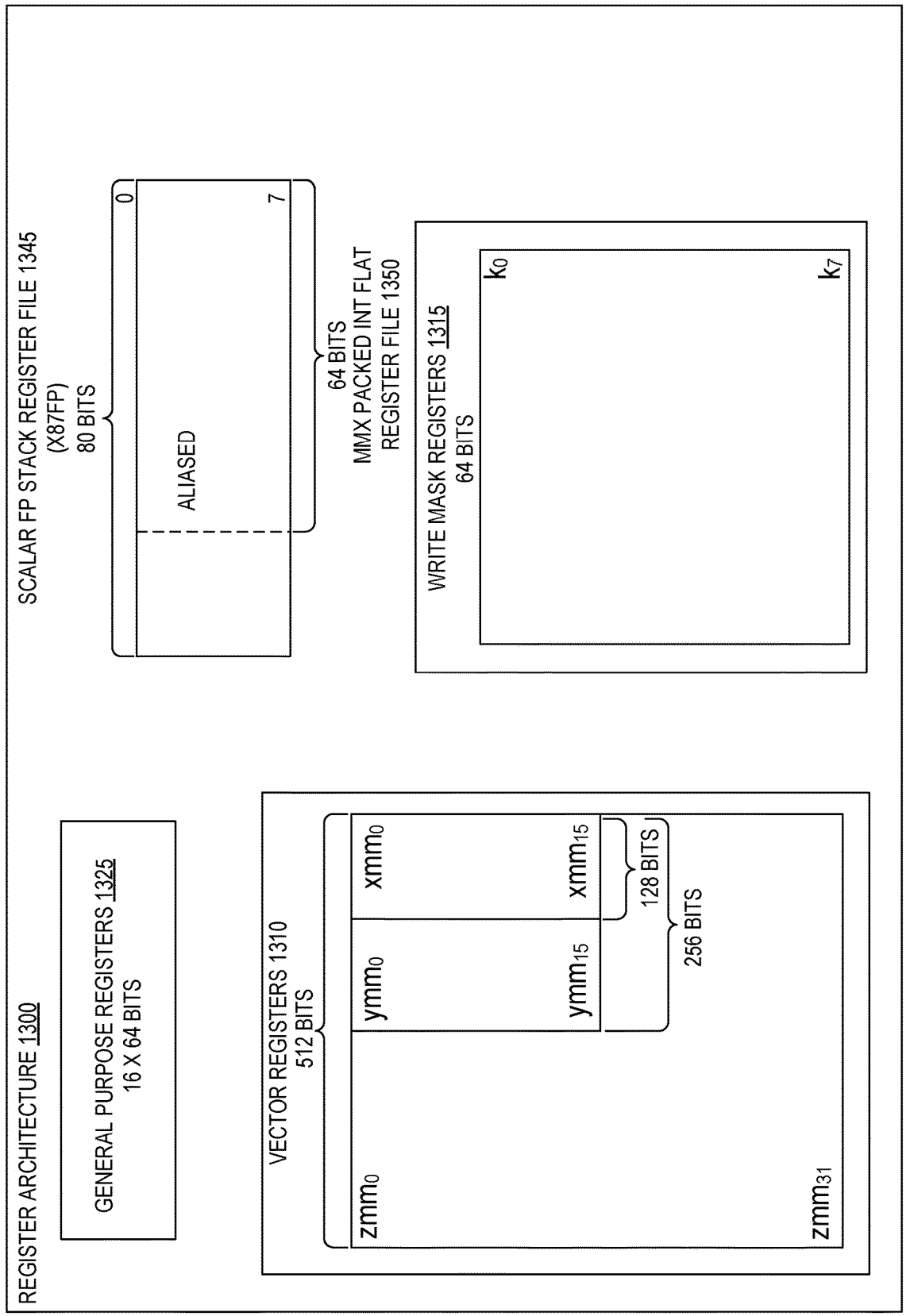
FIG. 13 is a block diagram of a register architecture according to one embodiment of the disclosure

FIG. 13 is a block diagram of a register architecture 1300 according to one embodiment of the disclosure. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
|---|---|---|---|
| Instruction Templates that do not include the vector length field 1159B | A (FIG. 11A; U = 0) B (FIG. 11B; U = 1) | 1110, 1115, 1125, 1130 1112 | zmm registers (the vector length is 64 byte) zmm registers (the vector length is 64 byte) |
| Instruction templates that do include the vector length field 1159B | B (FIG. 11B; U = 1) | 1117, 1127 | zmm, ymm, or xmm registers (the vector length is 64 byte, 32 byte, or 16 byte) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the disclosure. FIG. 14B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 14A-14B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder or decoder unit) may decode instructions (e.g., macro-instructions), and generate as an output one or more micro-operations, micro-code entry points, micro-instructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macro-instructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyper-Threading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
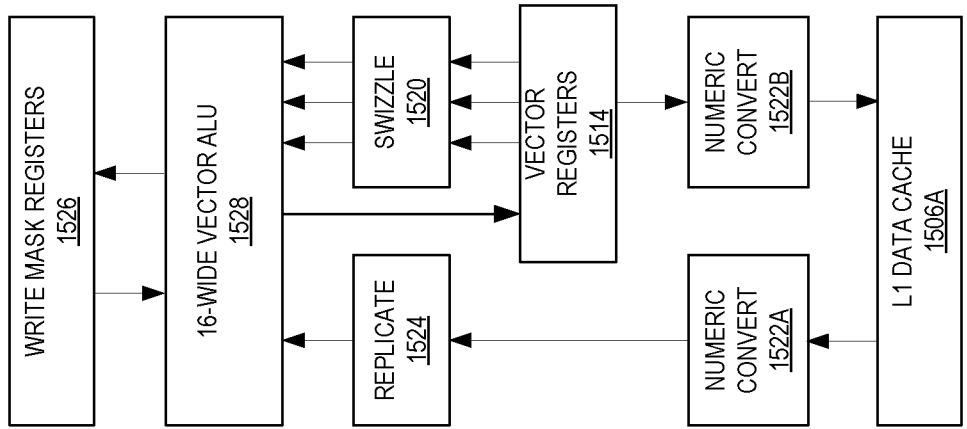
FIG. 15B is an expanded view of part of the processor core in FIG. 15A according to embodiments of the disclosure.
Figure 15A:
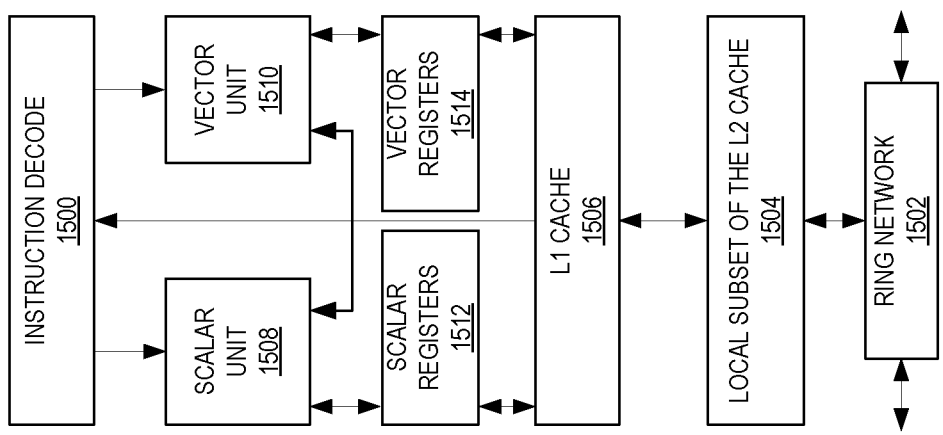
FIG. 15A is a block diagram of a single processor core, along with its connection to the on-die interconnect network and with its local subset of the Level 2 (L2) cache, according to embodiments of the disclosure.

FIGS. 15A-15B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache 1504, according to embodiments of the disclosure. In one embodiment, an instruction decode unit 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the disclosure may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the disclosure. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
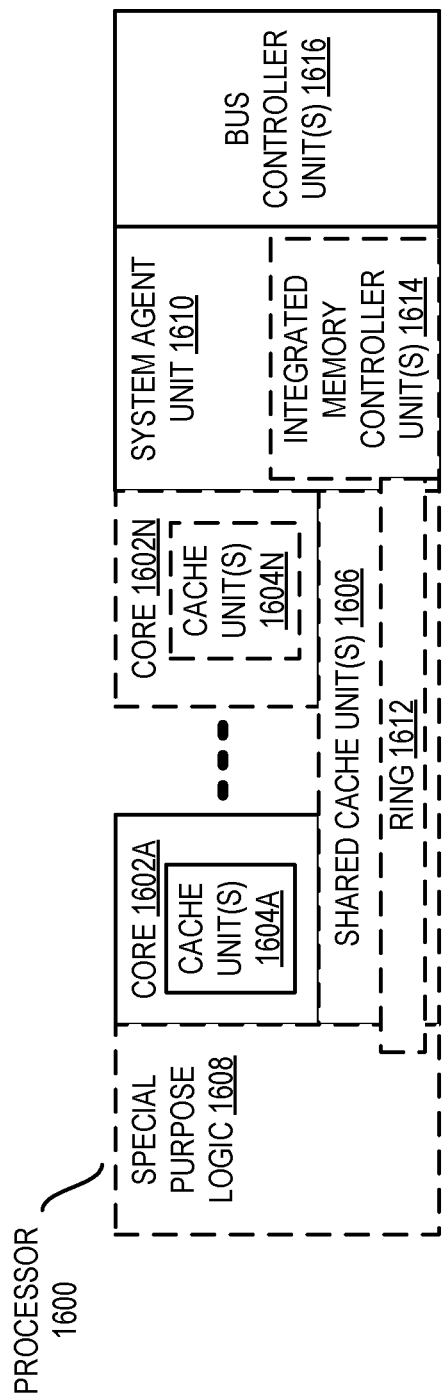
FIG. 16 is a block diagram of a processor that may have more than one core, may have an integrated memory controller, and may have integrated graphics according to embodiments of the disclosure.

FIG. 16 is a block diagram of a processor 1600 that may have more than one core, may have an integrated memory controller, and may have integrated graphics according to embodiments of the disclosure. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608, the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
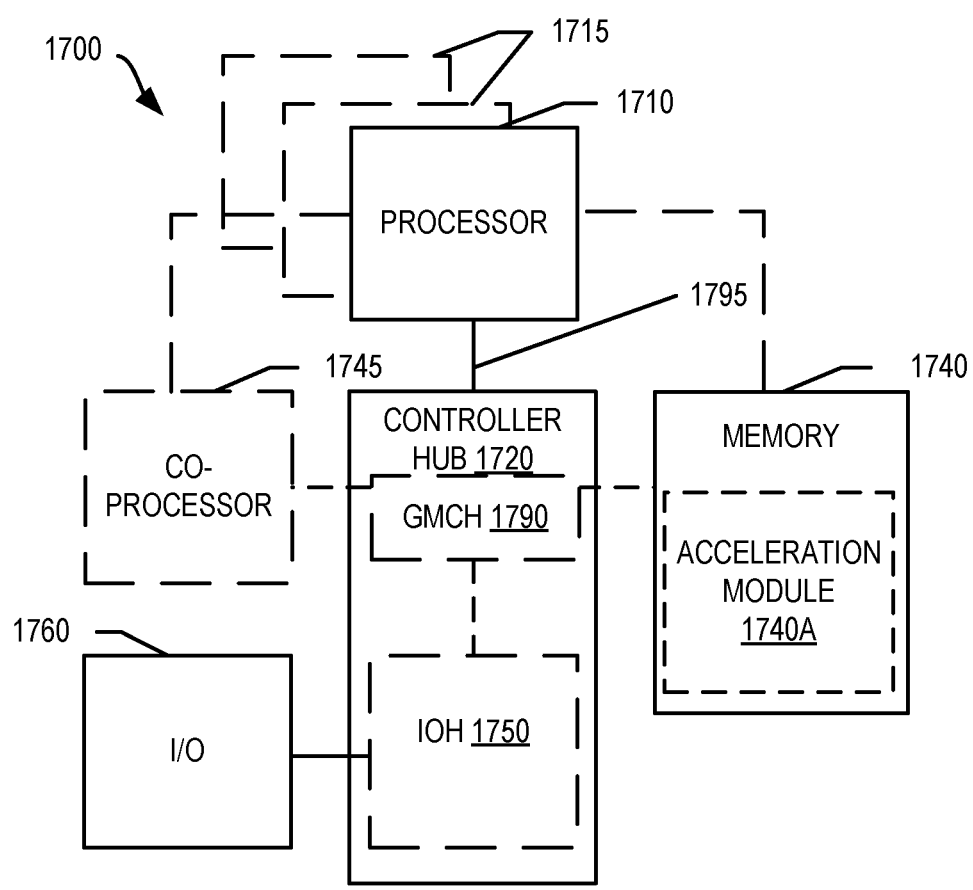
FIG. 17 is a block diagram of a system in accordance with one embodiment of the present disclosure.

Referring now to FIG. 17, shown is a block diagram of a system 1700 in accordance with one embodiment of the present disclosure. The system 1700 may include one or more processors 1710, 1715, which are coupled to a controller hub 1720. In one embodiment the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 is couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750. Memory 1740 may include an acceleration module 1740A, for example, to store code that when executed causes a processor to perform any method of this disclosure.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as Quickpath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
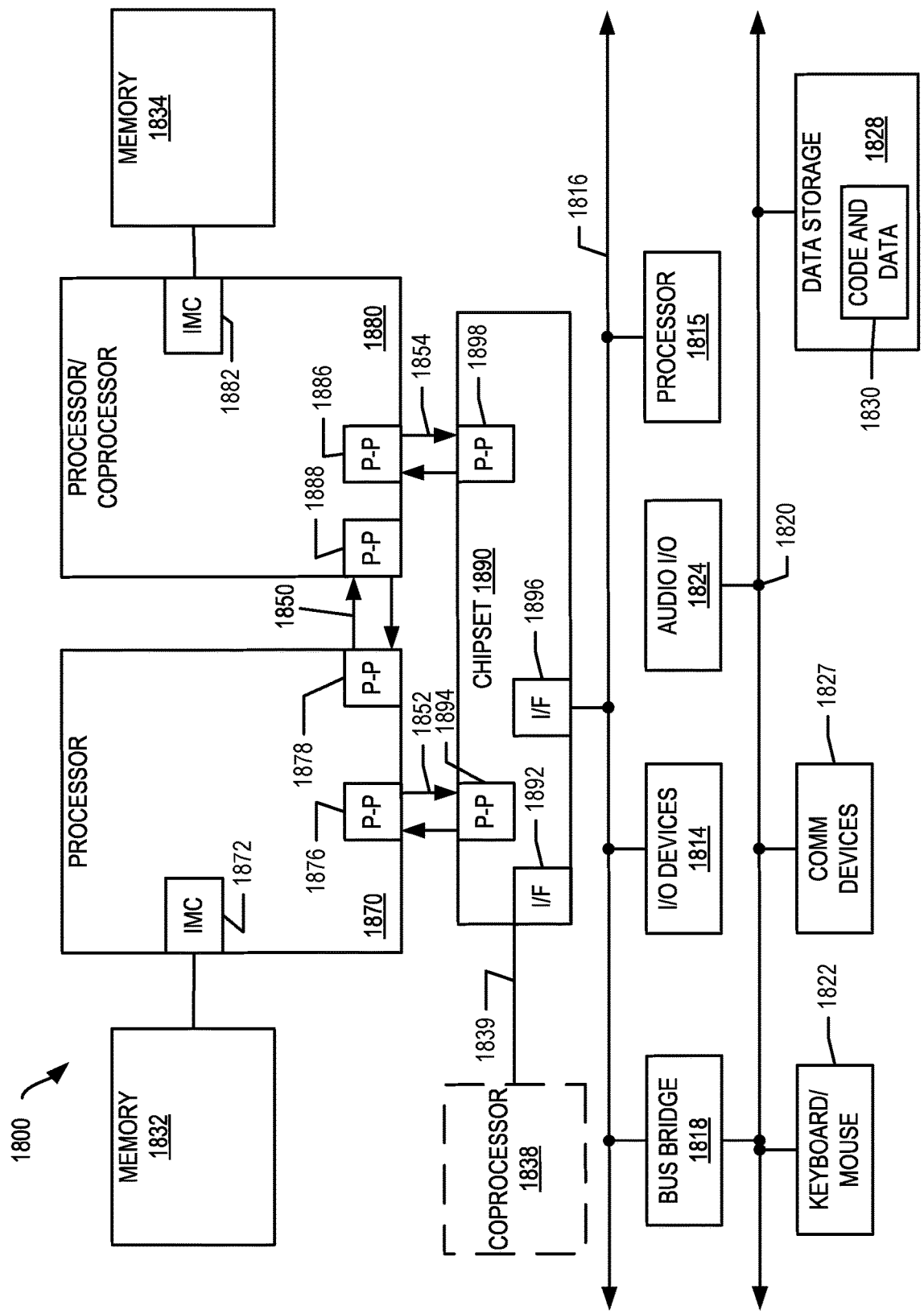
FIG. 18 is a block diagram of a more specific exemplary system in accordance with an embodiment of the present disclosure.

Referring now to FIG. 18, shown is a block diagram of a first more specific exemplary system 1800 in accordance with an embodiment of the present disclosure. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the disclosure, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1839. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present disclosure is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
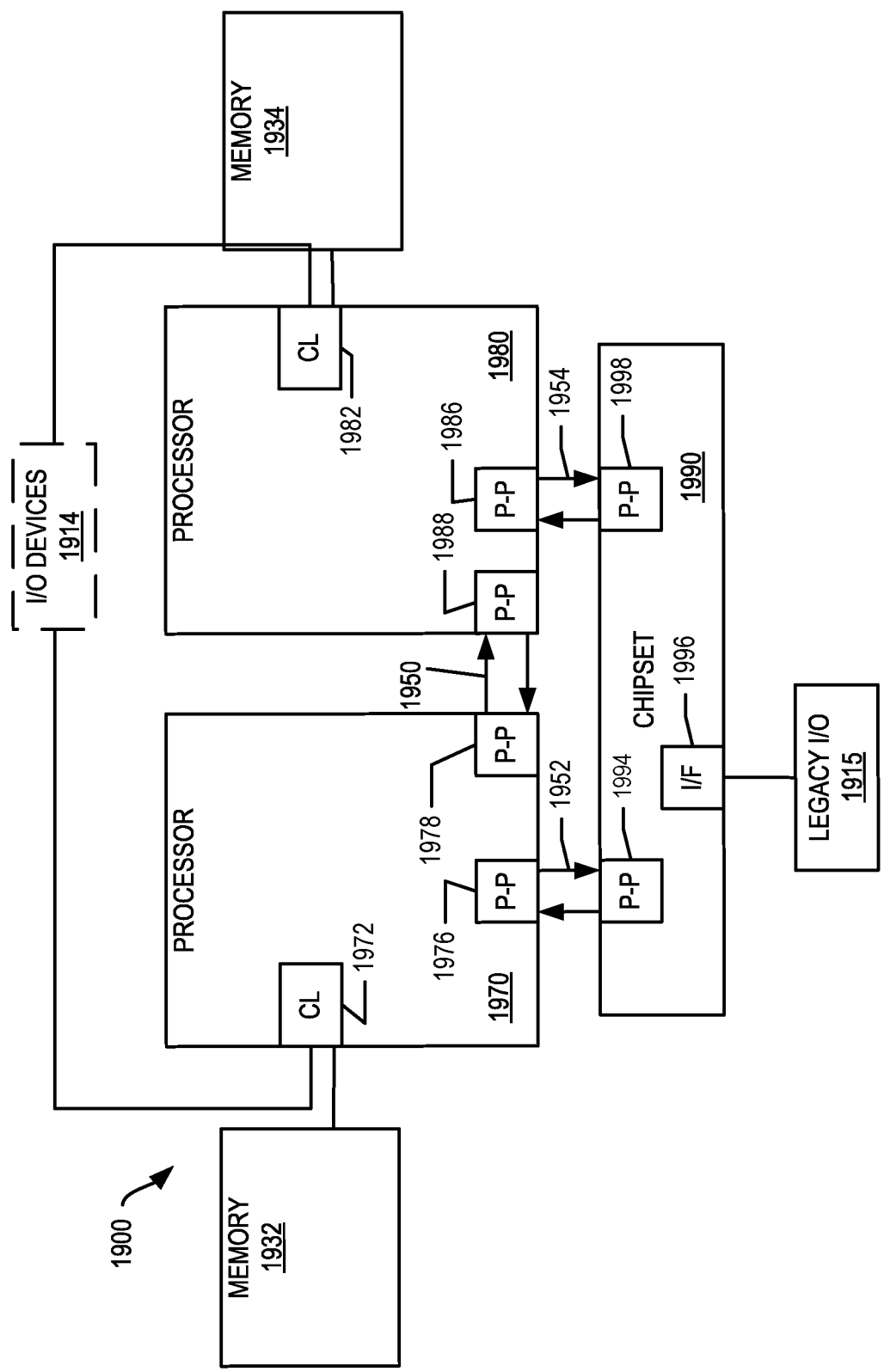
FIG. 19, shown is a block diagram of a second more specific exemplary system in accordance with an embodiment of the present disclosure.

Referring now to FIG. 19, shown is a block diagram of a second more specific exemplary system 1900 in accordance with an embodiment of the present disclosure Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 19 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
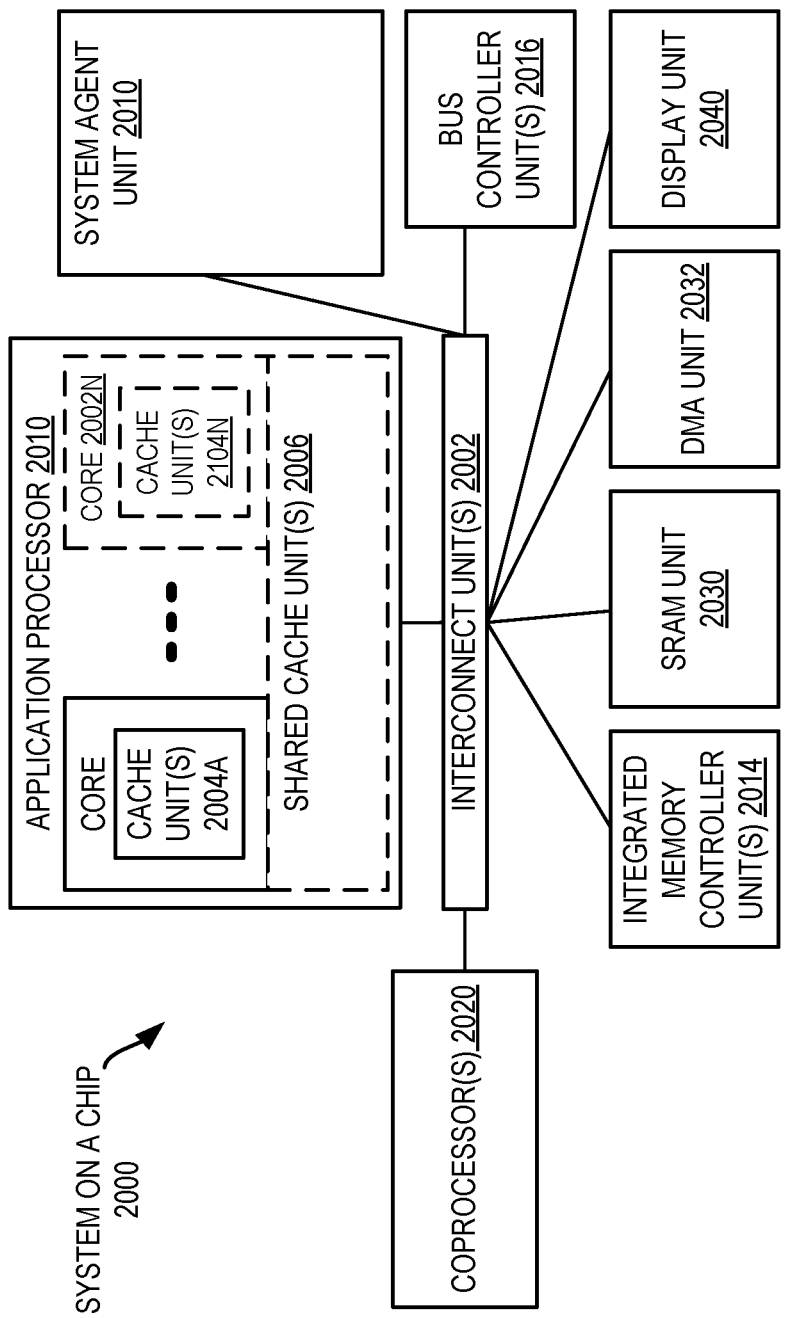
FIG. 20, shown is a block diagram of a system on a chip (SoC) in accordance with an embodiment of the present disclosure.

Referring now to FIG. 20, shown is a block diagram of a SoC 2000 in accordance with an embodiment of the present disclosure. Similar elements in FIG. 16 bear like reference numerals. Also, dashed lined boxes are optional features on more advanced SoCs. In FIG. 20, an interconnect unit(s)

2002 is coupled to: an application processor 2010 which includes a set of one or more cores 2002A-N and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 21:
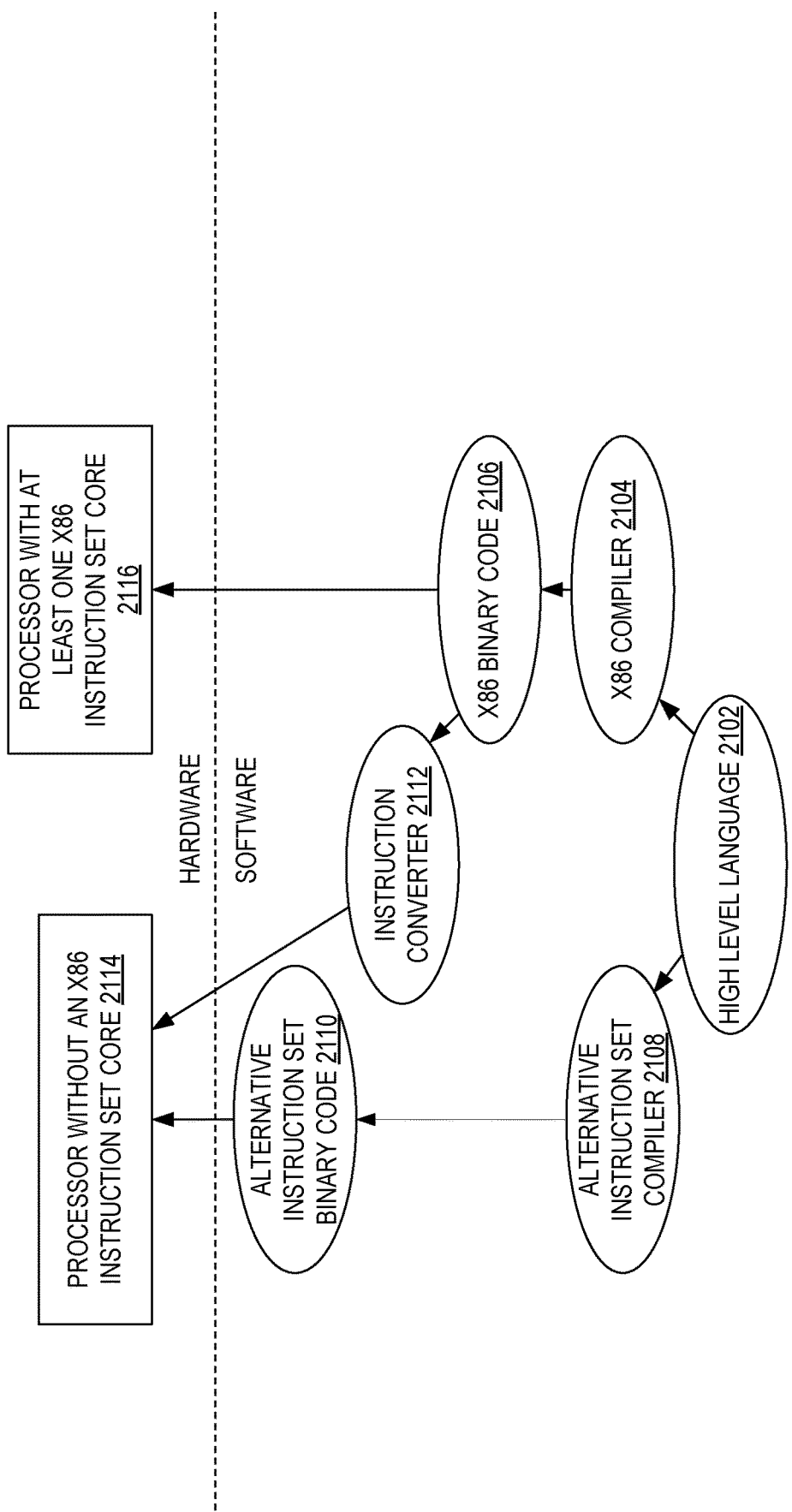
FIG. 21 is a block diagram contrasting the use of a software instruction converter to convert binary instructions in a source instruction set to binary instructions in a target instruction set according to embodiments of the disclosure.

FIG. 21 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 21 shows a program in a high level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel® processor with at least one x86 instruction set core by compatibly executing or otherwise processing (1) a substantial portion of the instruction set of the Intel® x86 instruction set core or (2) object code versions of applications or other software targeted to run on an Intel® processor with at least one x86 instruction set core, in order to achieve substantially the same result as an Intel® processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

What is claimed is:

1. An apparatus comprising:
a hardware accelerator comprising:
a plurality of processing elements coupled to form a plurality of logical rows of a multidimensional processing array and a plurality of logical columns of the multidimensional processing array,
wherein a processing element of the plurality of processing elements comprises a switch to selectively source, from either of an output for a first dataset from an upstream processing element of the plurality of processing elements processed by the upstream processing element or a boundary condition value for a second dataset stored in the processing element, based on a switch control value provided to the processing element;
a controller to track progress by the multidimensional processing array on a first input sequence of the first dataset and a second input sequence of the first dataset, and on a third input sequence of the second dataset and a fourth input sequence of the second dataset; and
a core coupled to the hardware accelerator, wherein the controller is to:
on completion of processing both the first input sequence of the first dataset and the second input sequence of the first dataset by the multidimensional processing array, send a first result of the processing of the first input sequence of the first dataset and the second input sequence of the first dataset, a first index identifying the first input sequence, and a second index identifying the second input sequence to the core, and
on completion of processing both the third input sequence of the second dataset and the fourth input sequence of the second dataset by the multidimensional processing array, send a second result of the processing of the third input sequence of the second dataset and the fourth input sequence of the second dataset, a third index identifying the third input sequence, and a fourth index identifying the fourth input sequence to the core.

2. The apparatus of claim 1, wherein the processing element is in a second logical column and a second logical row of the multidimensional processing array.

3. The apparatus of claim 1, wherein a second processing element of the plurality of processing elements comprises a switch to selectively source, from either of an output from the processing element of the plurality of processing elements or a boundary condition value stored in the second processing element, based on a switch control value provided to the second processing element.

4. The apparatus of claim 1, further comprising at least one register coupled to inputs of a first proper subset of the plurality of processing elements that form a first logical row of the plurality of logical rows of the multidimensional processing array and coupled to outputs of a second proper subset of the plurality of processing elements that form a last logical column of the plurality of logical columns of the multidimensional processing array to provide a result from the outputs of the second proper subset to the inputs of the first proper subset.

5. The apparatus of claim 1, wherein the hardware accelerator includes the controller.

6. The apparatus of claim 1, wherein when the second result arrives at the core before the first result, the core is to use the first index, second index, third index, and fourth index to reorder the first result and the second result.

7. The apparatus of claim 1, wherein the core is to provide the switch control value and the boundary condition value to the processing element.

8. A method comprising:
concurrently processing a first dataset and a second dataset with a plurality of processing elements forming a plurality of logical rows of a multidimensional processing array and a plurality of logical columns of the multidimensional processing array;
providing a switch control value to a processing element of the plurality of processing elements;
switching a switch of the processing element of the plurality of processing elements to selectively source, from either of an output for the first dataset from an upstream processing element of the plurality of processing elements processed by the upstream processing element or a boundary condition value for the second dataset stored in the processing element, based on the switch control value provided to the processing element;
tracking progress of the multidimensional processing array on a first input sequence of the first dataset and a second input sequence of the first dataset, and on a third input sequence of the second dataset and a fourth input sequence of the second dataset;
on completion of processing both the first input sequence of the first dataset and the second input sequence of the first dataset by the multidimensional processing array, sending a first result of the processing of the first input sequence of the first dataset and the second input sequence of the first dataset, a first index identifying the first input sequence, and a second index identifying the second input sequence to a processor core coupled to the plurality of processing elements; and
on completion of processing both the third input sequence of the second dataset and the fourth input sequence of the second dataset by the multidimensional processing array, sending a second result of the processing of the third input sequence of the second dataset and the fourth input sequence of the second dataset, a third index identifying the third input sequence, and a fourth index identifying the fourth input sequence to the processor core coupled to the plurality of processing elements.

9. The method of claim 8, wherein the processing element is in a second logical column and a second logical row of the multidimensional processing array.

10. The method of claim 8, further comprising:
providing a switch control value to a second processing element of the plurality of processing elements; and
switching a switch of the second processing element of the plurality of processing elements to selectively source, from either of an output from the processing element of the plurality of processing elements or a boundary condition value stored in the second processing element, based on the switch control value provided to the second processing element.

11. The method of claim 8, further comprising sending an intermediate value of the processing of the first dataset or the second dataset from a first proper subset of the plurality of processing elements that form a last logical column of the plurality of logical columns of the multidimensional processing array to a second proper subset of the plurality of processing elements that form a first logical column of the plurality of logical columns of the multidimensional processing array.

12. The method of claim 8, wherein the tracking the progress of the multidimensional processing array is by a controller of the multidimensional processing array.

13. The method of claim 8, further comprising reordering the first result and the second result based on the first index, second index, third index, and fourth index when the second result arrives at the processor core before the first result.

14. The method of claim 8, further comprising providing the switch control value and the boundary condition value to the processing element from a processor core coupled to the plurality of processing elements.

15. A hardware accelerator comprising:
a plurality of processing elements coupled to form a plurality of logical rows of a multidimensional processing array and a plurality of logical columns of the multidimensional processing array,
wherein a processing element of the plurality of processing elements comprises a switch to selectively source, from either of an output for a first dataset from an upstream processing element of the plurality of processing elements processed by the upstream processing element or a boundary condition value for a second dataset stored in the processing element, based on a switch control value provided to the processing element; and
a controller to track progress by the multidimensional processing array on a first input sequence of the first dataset and a second input sequence of the first dataset, and on a third input sequence of the second dataset and a fourth input sequence of the second dataset, wherein the controller is to:
on completion of processing both the first input sequence of the first dataset and the second input sequence of the first dataset by the multidimensional processing array, send a first result of the processing of the first input sequence of the first dataset and the second input sequence of the first dataset, a first index identifying the first input sequence, and a second index identifying the second input sequence as an output of the hardware accelerator, and
on completion of processing both the third input sequence of the second dataset and the fourth input sequence of the second dataset by the multidimensional processing array, send a second result of the processing of the third input sequence of the second dataset and the fourth input sequence of the second dataset, a third index identifying the third input sequence, and a fourth index identifying the fourth input sequence as an output of the hardware accelerator.

16. The hardware accelerator of claim 15, wherein the processing element is in a second logical column and a second logical row of the multidimensional processing array.

17. The hardware accelerator of claim 15, wherein a second processing element of the plurality of processing elements comprises a switch to selectively source, from either of an output from the processing element of the plurality of processing elements or a boundary condition value stored in the second processing element, based on a switch control value provided to the second processing element.

18. The hardware accelerator of claim 15, further comprising at least one register coupled to inputs of a first proper subset of the plurality of processing elements that form a first logical column of the plurality of logical columns of the multidimensional processing array and coupled to outputs of a second proper subset of the plurality of processing elements that form a last logical column of the plurality of logical columns of the multidimensional processing array to provide a result from the outputs of the second proper subset to the inputs of the first proper subset.

19. The hardware accelerator of claim 15, wherein the second result is sent as the output of the hardware accelerator before the first result is sent as the output of the hardware accelerator.

20. The hardware accelerator of claim 15, wherein the switch control value and the boundary condition value for the processing element are inputs into the hardware accelerator.

* * * * *